US011661129B2

(12) United States Patent
Chambers et al.

(10) Patent No.: US 11,661,129 B2
(45) Date of Patent: May 30, 2023

(54) PNEUMATIC ONLY HEIGHT ADJUST SEAT POST ASSEMBLY

(71) Applicant: SRAM, LLC, Chicago, IL (US)

(72) Inventors: Rafer Chambers, Colorado Springs, CO (US); Charles Dunlap, Manitou Springs, CO (US)

(73) Assignee: SRAM, LLC, Chicago, IL (US)

( * ) Notice: Subject to any disclaimer, the term of this patent is extended or adjusted under 35 U.S.C. 154(b) by 0 days.

(21) Appl. No.: 16/917,436

(22) Filed: Jun. 30, 2020

(65) Prior Publication Data
US 2021/0403111 A1 Dec. 30, 2021

(51) Int. Cl.
*B62J 1/08* (2006.01)
*B62J 1/06* (2006.01)

(52) U.S. Cl.
CPC ........................... *B62J 1/06* (2013.01)

(58) Field of Classification Search
CPC .................................. B62J 1/06; F16F 9/0209
USPC ........................................................ 297/208
See application file for complete search history.

(56) References Cited

U.S. PATENT DOCUMENTS

| 7,083,180 | B2 | 8/2006 | Turner |
| 8,596,663 | B2 | 12/2013 | Shirai |
| 9,688,331 | B1 | 6/2017 | Shirai |
| 10,131,391 | B2 | 11/2018 | Shirai |
| 10,202,158 | B2 | 2/2019 | Jhou et al. |
| 10,358,180 | B2 | 7/2019 | Shipman et al. |
| 10,472,012 | B2 | 11/2019 | Shirai |
| 2006/0066074 | A1 | 3/2006 | Turner |
| 2011/0049945 | A1 | 3/2011 | Mouri et al. |
| 2012/0247894 | A1 | 10/2012 | Shirai |
| 2014/0061419 | A1 | 3/2014 | Wehage et al. |
| 2015/0300382 | A1 | 10/2015 | Kuo |
| 2017/0225734 | A1 | 3/2017 | Shirai |
| 2017/0130741 | A1 | 5/2017 | Pittens et al. |

(Continued)

FOREIGN PATENT DOCUMENTS

| CN | 102730135 A | 10/2012 |
| CN | 204688263 U | 10/2015 |

(Continued)

OTHER PUBLICATIONS

Web Page, Feb. 22, 2019, https://www.pinkbike.com/forum/listcomments/?threadid=212017, Last Checked Jan. 28, 2022.

(Continued)

*Primary Examiner* — Sarah B McPartlin

(57) ABSTRACT

A seat post assembly for a bicycle includes a first tube having a first distal end and a second tube having a second distal end. A distance between the first distal end of the first tube and the second distal end of the second tube is at a maximum when the first tube is in a first position relative to the second tube. The seat post assembly also includes a first chamber and a second chamber that are fluidly coupleable. The first chamber is a positive fluid chamber, and the second chamber is a negative fluid chamber. The seat post assembly includes a fluid volume disposed in the first chamber and the second chamber. The fluid volume includes a compressible fluid. The first chamber is configured to act as a spring configured to bias the first tube towards the first position relative to the second tube.

24 Claims, 22 Drawing Sheets

(56) References Cited

U.S. PATENT DOCUMENTS

| | | | |
|---|---|---|---|
| 2018/0186419 A1* | 7/2018 | Shipman | B62K 19/36 |
| 2019/0351966 A1* | 11/2019 | Shirai | B62J 99/00 |
| 2020/0017156 A1 | 1/2020 | Madau et al. | |
| 2020/0140029 A1 | 5/2020 | Shipman et al. | |

FOREIGN PATENT DOCUMENTS

| | | |
|---|---|---|
| CN | 205098346 U | 3/2016 |
| CN | 107042853 A | 8/2017 |
| CN | 107792234 A | 3/2018 |
| CN | 108297982 A | 7/2018 |
| CN | 108323978 A | 7/2018 |
| CN | 111137380 A | 5/2020 |
| DE | 1.02009 E | 8/2010 |
| EP | 3412544 A1 | 12/2018 |
| TW | 201829239 A | 8/2018 |
| TW | I691426 | 4/2020 |
| TW | M592848 U | 4/2020 |
| WO | 2006039195 A2 | 4/2006 |

OTHER PUBLICATIONS

Jeff Barber, Pro Koryak Dropper Post is Fun to Install, Easy to Operate [Review], Web Page, https://www.singletracks.com/mtb-gear/pro-koryak-dropper-post-is-fun-to-install-easy-to-operate-review/, Last Checked Jan. 28, 2022.

Cory Benson, DT Swiss D 232 drops lightweight carbon XC dropper seatpost in 27.2 & 30.9, Web Page, Jan. 23, 2020, https://bikerumor.com/dt-swiss-d-232-drops-lightweight-carbon-xc-dropper-seatpost-in-27-2-30-9mm/, Last Checked Jan. 28, 2022.

Andy McCandlish, Race Face Aeffect-R dropper post review, Web Page, https://www.bikeradar.com/reviews/components/seatposts/race-face-aeffect-r-dropper-post-review/. Last Checked Jan. 28, 2022.

* cited by examiner

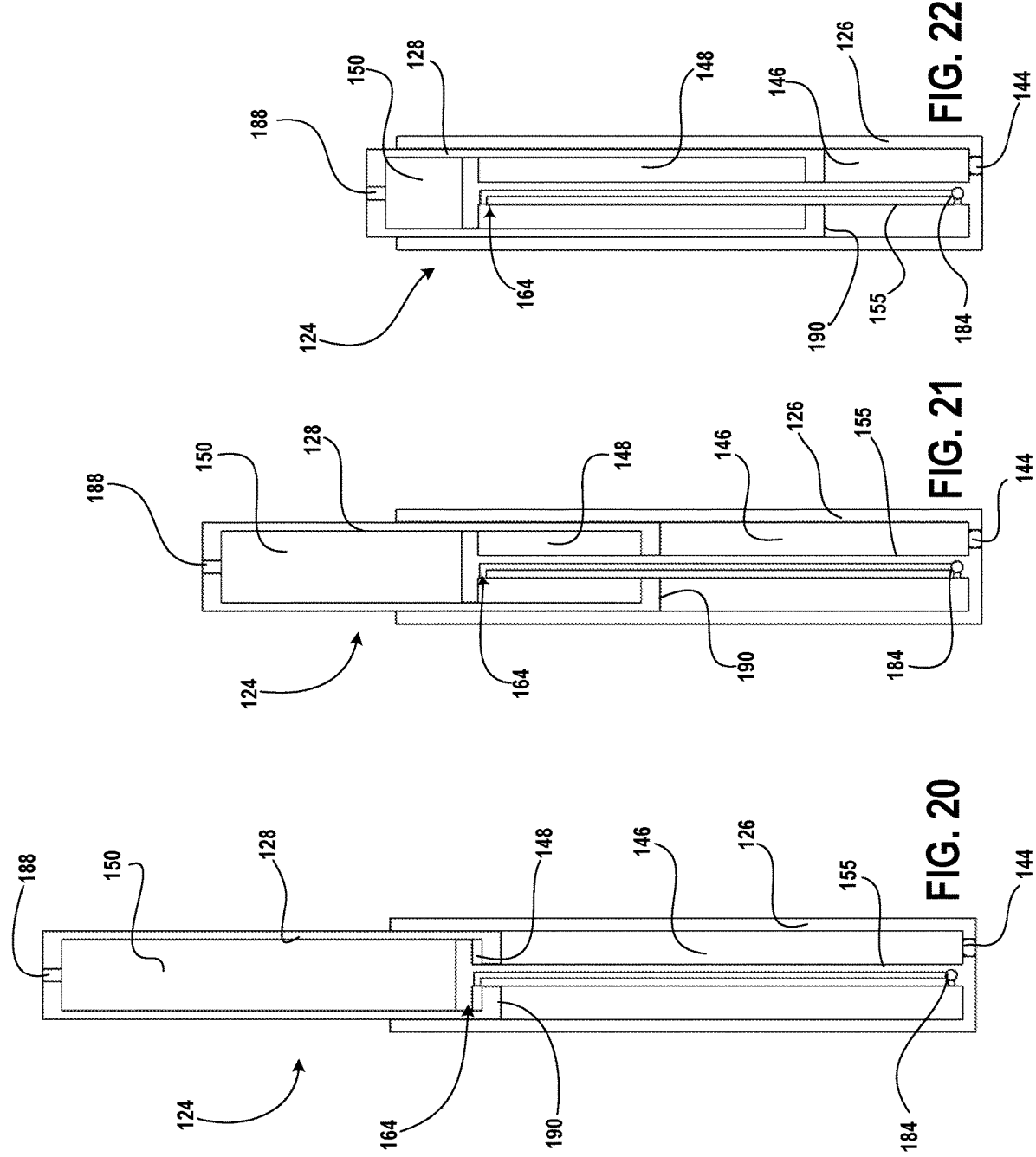

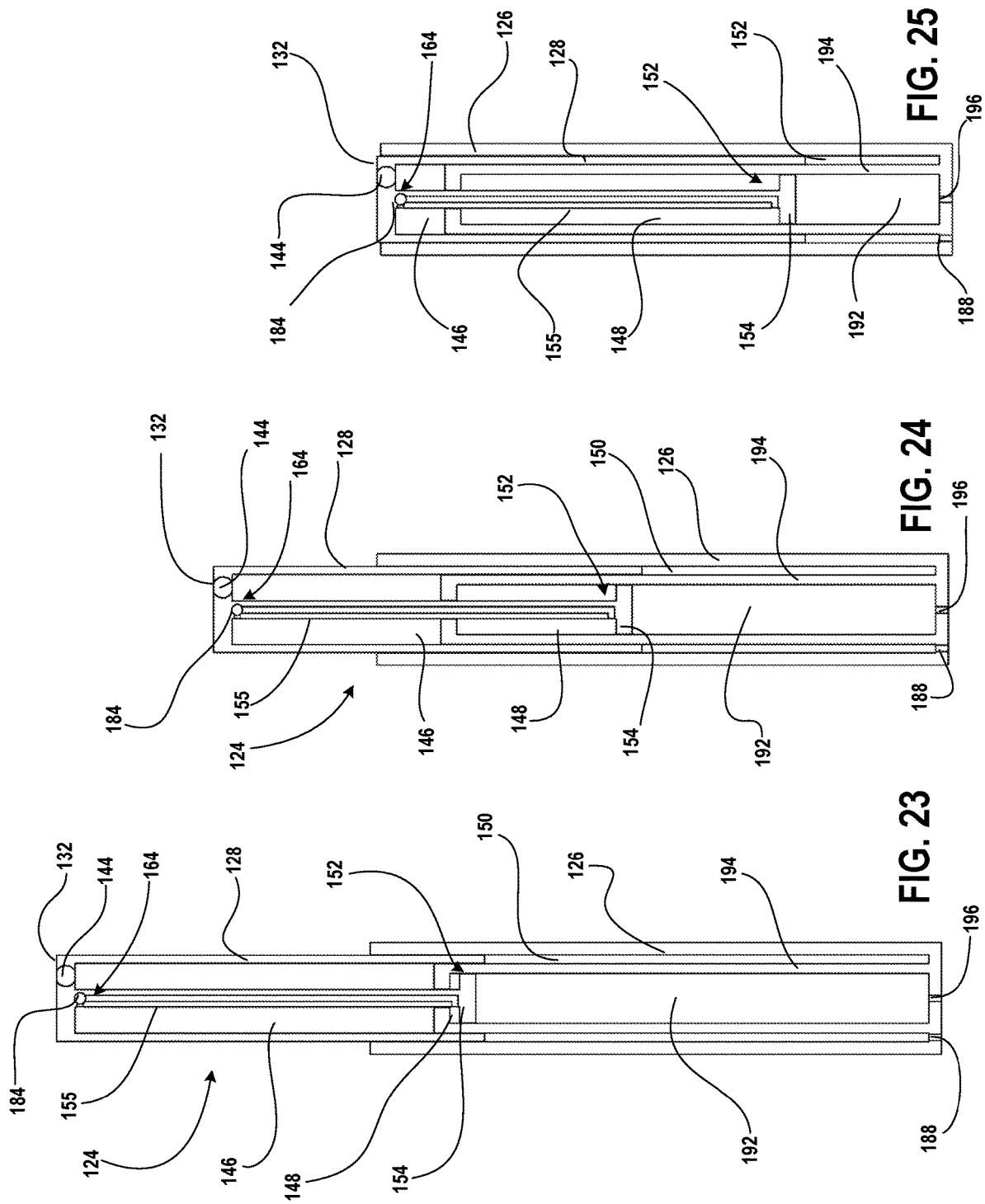

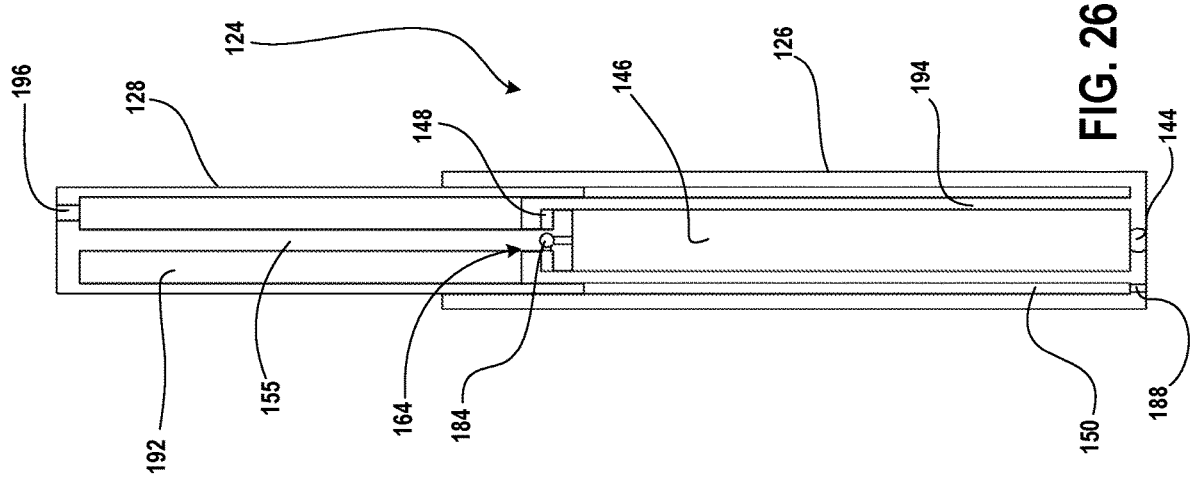

PNEUMATIC ONLY HEIGHT ADJUST SEAT POST ASSEMBLY

BACKGROUND

Field of the Disclosure

The present disclosure is generally directed to a seat post assembly for a bicycle, and more particularly, to a pneumatic only height adjust seat post assembly.

DESCRIPTION OF RELATED ART

Bicycles are known to have a seat or saddle to support a rider in a seated position. The position of the saddle on most bicycles is adjustable in some manner. The saddle may be adjustable so that a given bicycle may be configured to accommodate different riders of various sizes. The saddle may also be adjustable to allow a given rider to set or reset the saddle position on a specific bicycle to accommodate different riding conditions.

In one example, a bicycle may have a height adjustable seat post assembly. Thus, the height of the saddle may be selectively adjusted relative to a frame of the bicycle. The typical bicycle has a saddle mounted to a post that is mechanically clamped to a tube of the bicycle frame. When the clamp is released, the saddle and post are slidable up and down relative to the tube of the bicycle frame to adjust the height of the saddle.

On more recent higher end bicycles, however, the seat post is height adjustable during riding of the bicycle by employing some type of hydraulic assist mechanism. For example, manually actuated hydraulic height adjustable or "dropper" seat posts may use a hydraulic pressure differential within the post and require manual operation to adjust the seat post height. Some products may use ANT+ wireless communication technology allowing the rider to wirelessly adjust the saddle height.

Over time, hydraulic height adjustable seat posts are susceptible to suspensioning and gapping. Suspensioning may occur when the seat post is weighted or unweighted at top out (e.g., a fully extended position of the seat post) and causes the seat post to move up and down (e.g., more than 5 mm) relative to a frame of the bicycle. This prevents a rigid top. With gapping, the seat is no longer able to return to the top out position. Suspensioning and gapping may be caused by the migration of air past seals and into a fluid reservoir within the seat post.

SUMMARY

In one example, a seat post assembly for a bicycle includes a first tube having a first distal end and a second tube having a second distal end. The first tube is movable relative to the second tube to establish a distance between the first distal end of the first tube and the second distal end of the second tube along a tube axis. The distance between the first distal end of the first tube and the second distal end of the second tube is at a maximum when the first tube is in a first position relative to the second tube, and the distance between the first distal end of the first tube and the second distal end of the second tube is at a minimum when the first tube is in a second position relative to the second tube. The seat post assembly also includes a first chamber and a second chamber that are fluidly coupleable. The first chamber is a positive fluid chamber, and the second chamber is a negative fluid chamber. The seat post assembly includes a fluid volume disposed in the first chamber and the second chamber. The fluid volume is entirely or primarily a compressible fluid. The first chamber is configured to act as a spring configured to bias the first tube towards the first position relative to the second tube.

In one example, the first chamber and the second chamber are within the first tube.

In one example, the seat post assembly further includes a third chamber outside of a flow path connecting the first chamber and the second chamber. The third chamber is within the second tube.

In one example, the seat post assembly further includes a piston separating the first chamber and the second chamber, and a flow path connecting the first chamber and the second chamber through the piston.

In one example, the seat post assembly further includes a valve including an isolator. The isolator is configured to move between a closed position closing the flow path and an open position opening the flow path between the first chamber and the second chamber. The relative movement between the first tube and the second tube is allowed when the isolator is in the open position.

In one example, the second chamber is configured to receive a portion of the compressible fluid when the isolator is in the open position and a force is applied to the first distal end of the first tube.

In one example, the piston has a first side and a second side opposite the first side. The first side of the piston partially defines the first chamber, and the second side of the piston partially defines the second chamber. A volume of the first chamber and a volume of the second chamber are based on a position of the piston relative to the first tube.

In one example, a total chamber volume, including the volume of the first chamber and the volume of the second chamber, is variable based on the position of the piston relative to the first tube, such that the total chamber volume when the first tube is in the first position relative to the second tube is greater than the total chamber volume when the first tube is in the second position relative to the second tube.

In one example, a surface area of the first side as viewed along the tube axis is greater than a surface area of the second side as viewed along the tube axis.

In one example, the compressible fluid is a gas.

In one example, a volume of the first chamber is larger than a volume of the second chamber when the first tube is in the first position relative to the second tube.

In one example, the volume of the second chamber is no more than ten percent of the volume of the first chamber when the first tube is in the first position relative to the second tube.

In one example, the volume of the second chamber is no more than three percent of the volume of the first chamber when the first tube is in the first position relative to the second tube. In some examples, the second chamber may be no more than one percent of the volume of the first chamber when the first tube is in the first position relative to the second tube.

In one example, when the first tube is in the first position relative to the second tube, a majority of the fluid volume disposed in the first chamber is the compressible fluid.

In one example, the seat post assembly includes a fill valve. The fill valve is disposed within the first chamber.

In one example, the first tube is keyed to the second tube, such that the first tube is translatable relative to the second tube but is not rotatable relative to the second tube.

In one example, the first chamber and the second chamber are disposed within the second tube.

In one example, a seat post assembly for a bicycle includes a telescoping tube structure including a first tube and a second tube. The first tube and the second tube are movable relative to each other. The telescoping tube structure has a maximum length when the first tube is in a first position relative to the second tube. The seat post assembly also includes a first chamber and a second chamber that are fluidly coupleable. The first chamber is disposed within the first tube or the second tube, and the second chamber is disposed within the first tube or the second tube. The seat post assembly includes a fluid disposed in the first chamber and the second chamber. A portion of the fluid is configured to act as a spring configured to bias the first tube towards the first position relative to the second tube. The first chamber and the second chamber are fluidly coupleable, such that the second chamber is configured to receive part of the fluid when the telescoping tube structure is compressed. A volume of the first chamber is larger than a volume of the second chamber when the first tube is in the first position relative to the second tube.

In one example, the first chamber is a positive fluid chamber, and the second chamber is a negative fluid chamber. The portion of the fluid is a portion of the fluid disposed within the first chamber. The portion of the fluid disposed within the first chamber is configured to act as the spring configured to bias the first tube towards the first position relative to the second tube.

In one example, the volume of the second chamber is no more than ten percent of the volume of the first chamber when the first tube is in the first position relative to the second tube.

In one example, the volume of the second chamber is no more than three percent of the volume of the first chamber when the first tube is in the first position relative to the second tube.

In one example, the fluid includes a compressible fluid.

In one example, the second chamber includes less than three percent of the fluid by volume when the first tube is in the first position relative to the second tube.

In one example, a seat post assembly for a bicycle includes a telescoping tube structure including a first tube and a second tube. The first tube has a first distal end, and the second tube has a second distal end. The first tube is movable relative to the second tube, such that a distance between the first distal end of the first tube and the second distal end of the second tube is at a maximum when the first tube is in a position relative to the second tube. The seat post assembly also includes a first chamber and a second chamber disposed within the telescoping tube structure. The first chamber and the second chamber include a fluid forming a pneumatic spring configured to bias the first tube in a direction away from the second tube. The seat post assembly includes a piston separating the first chamber and the second chamber, and a flow path connecting the first chamber and the second chamber. The piston has a first side and a second side opposite the first side. The first side of the piston partially defines the first chamber, and the second side of the piston partially defines the second chamber. A volume of the first chamber is larger than a volume of the second chamber when the distance between the first distal end of the first tube and the second distal end of the second tube is at the maximum.

BRIEF DESCRIPTION OF THE DRAWINGS

Objects, features, and advantages of the present invention will become apparent upon reading the following description in conjunction with the drawing figures, in which:

FIG. 20 is a simplified schematic diagram of a third seat post assembly, in a fully extended position;

FIG. 21 is a simplified schematic diagram of the third seat post assembly of FIG. 20, in an intermediate position;

FIG. 22 is a simplified schematic diagram of the third seat post assembly of FIG. 20, in a fully retracted position;

FIG. 23 is a simplified schematic diagram of a fourth seat post assembly, in a fully extended position;

FIG. 24 is a simplified schematic diagram of the fourth seat post assembly of FIG. 23, in an intermediate position;

FIG. 25 is a simplified schematic diagram of the fourth seat post assembly of FIG. 23, in a fully retracted position;

FIG. 26 is a simplified schematic diagram of a fifth seat post assembly, in a fully extended position;

FIG. 27 is a simplified schematic diagram of the fifth seat post assembly of FIG. 26, in an intermediate position;

FIG. 28 is a simplified schematic diagram of the fifth seat post assembly of FIG. 26, in a fully retracted position;

DETAILED DESCRIPTION OF THE DISCLOSURE

Figure 1:
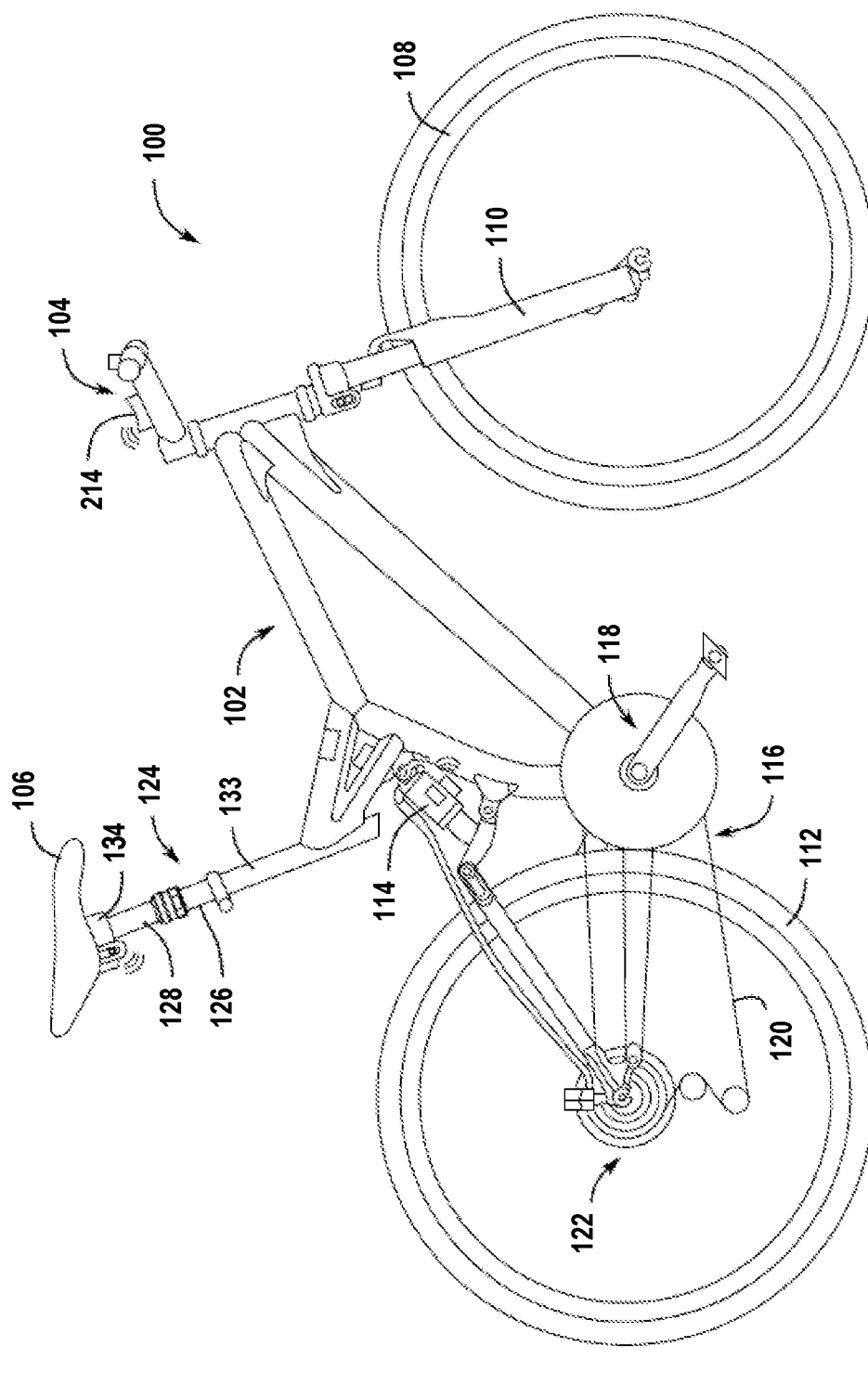
FIG. 1 is a side view of one example of a bicycle that may be fitted with a seat post assembly constructed in accordance with the teachings of this disclosure.

The present disclosure provides examples of seat post assemblies that solve or improve upon one or more of the above-noted and/or other disadvantages with prior known seat post assemblies. The disclosed seat post assemblies eliminate the need to include hydraulics, and a seat post is held in place with pneumatics. The movement spring of the seat post assembly may be a pneumatic spring.

The pneumatic only seat post assembly operates due to a positive air volume piston area versus pneumatic pressure ratio being able to hold up a rider. This is also dependent on an initial negative volume at top out. Top out may be a position at which a piston of the seat post assembly is in mechanical contact with a seal head or another component connected to the seal head. The negative volume at top out may be minimized to allow for quick depressurization. The seat post assembly may thus act like a zero negative pressure preloaded pneumatic spring.

The same concept is applied at bottom out. In other words, the positive volume may be minimized so that the saddle is perceived as rigid when the seat post is at bottom out. At top out and bottom out, the saddle may move relative to the frame of the bicycle, but the movement is not perceivable to the rider.

The seat post may be stopped at any position between bottom out and top out (e.g., middle or intermediate positions). In any of the middle positions, the saddle is held in position by a force balanced pneumatic spring, so a position of the saddle may change with force.

A significant advantage of the disclosed seat post assemblies is that the elimination of the hydraulics system from the seat post assembly eliminates suspensioning and gapping of the seat post due to entrained air in the fluid reservoir of the hydraulics system. Main warranty symptoms for hydraulic height adjustable seat posts are suspensioning and gapping, so the disclosed seat post assemblies may greatly reduce the number of warranty replacements.

Another advantage of the disclosed seat post assemblies is that the elimination of the hydraulics system from the seat post assembly reduces the complexity of the seat post assembly. This simplicity of the disclosed seat post assemblies provides for fewer parts, fewer sealing locations, and a lesser weight compared to seat post assemblies of the prior art. This may lead to a lower cost due to the removal and simplification of parts, and a simpler manufacturing process.

Another advantage of the disclosed seat post assemblies is that a consistent lowering force is provided between top out and bottom out. This is due to there being little change in a total system volume between top out and bottom out.

These and other objects, features, and advantages of the disclosed seat post assemblies will become apparent to those having ordinary skill in the art upon reading this disclosure. Throughout the drawing figures, where like reference numbers are used, the like reference numbers represent the same or substantially similar parts among the various disclosed examples. Also, specific examples are disclosed and described herein that utilize specific combinations of the disclosed aspects, features, and components of the disclosure. However, it is possible that each disclosed aspect, feature, and/or component of the disclosure may, in other examples not disclosed or described herein, be used independent of or in different combinations with other of the aspects, features, and components of the disclosure.

Turning now to the drawings, FIG. 1 illustrates one example of a human powered vehicle on which the disclosed seat post assembly may be implemented. In this example, the vehicle is one possible type of bicycle 100, such as a mountain bicycle. The bicycle 100 has a frame 102, handlebars 104 near a front end of the frame 102, and a seat or saddle 106 for supporting a rider over a top of the frame 102. The bicycle 100 also has a first or front wheel 108 carried by a front fork 110 of the frame 102 and supporting the front end of the frame 102. The bicycle 100 also has a second or rear wheel 112 supporting a rear end of the frame 102. The rear end of the frame 102 may be supported by a rear suspension component 114. The bicycle 100 also has a drive train 116 with a crank assembly 118 that is operatively coupled via a chain 120 to a rear cassette 122 near a rotation axis of the rear wheel 112. In this example, the saddle 106 is supported on a seat post assembly 124 constructed in accordance with the teachings of the present disclosure.

While the bicycle 100 depicted in FIG. 1 is a mountain bicycle, the seat post assembly 124, including the specific embodiments and examples disclosed herein as well as alternative embodiments and examples, may be implemented on other types of bicycles. For example, the disclosed seat post assembly 124 may be used on road bicycles, as well as bicycles with mechanical (e.g., cable, hydraulic, pneumatic, etc.) and non-mechanical (e.g., wired, wireless) drive systems. The disclosed seat post assembly 124 may also be implemented on other types of two-, three-, and four-wheeled human powered vehicles as well.

With that in mind and referring to FIGS. 2-6, the saddle 106 is attachable to and carried on the top of the seat post assembly 124. The disclosed seat post assembly 124 has a lower post segment (e.g., a lower tube 126) and an upper post segment (e.g., an upper tube 128). The upper tube 128 (e.g., a first tube) and the lower tube 126 (e.g., a second tube) are movable relative to one another to establish a height of the saddle 106 relative to the frame 102. In this example, the lower tube 126 has a lower distal end 130 defining a lower end of the seat post assembly 124. The upper tube 128 has an upper distal end 132 (e.g., a first distal end) defining an upper end of the seat post assembly 124. In one example, the lower distal end 130 (e.g., a second distal end) may be received in and clamped or otherwise secured in a frame tube 133 (see FIG. 1) of the frame 102 in a conventional manner. Thus, the lower tube 126 may be fixed relative to the frame 102 during use, and the upper tube 128 may be slidably and telescopically received in or on the lower tube 126. The upper tube 128 may slide telescopically along a tube axis T relative to the lower tube 126 to establish a distance between the first distal end 132 and the second distal end 130, respectively.

A head 134 is fixed to the top of the seat post assembly 124 (e.g., to the first distal end 132 of the upper tube 128). The saddle 106 is mountable to and carried on the head 134 to attach the saddle 106 to the seat post assembly 124. In one embodiment, the head 134 includes a saddle clamp mechanism 135 that provides saddle fore-aft and tilt adjustment features. In another embodiment, the head 134 is configured to include an electronics module that provides functions for the seat height adjustment feature of the disclosed seat post assembly 124.

Figure 2:
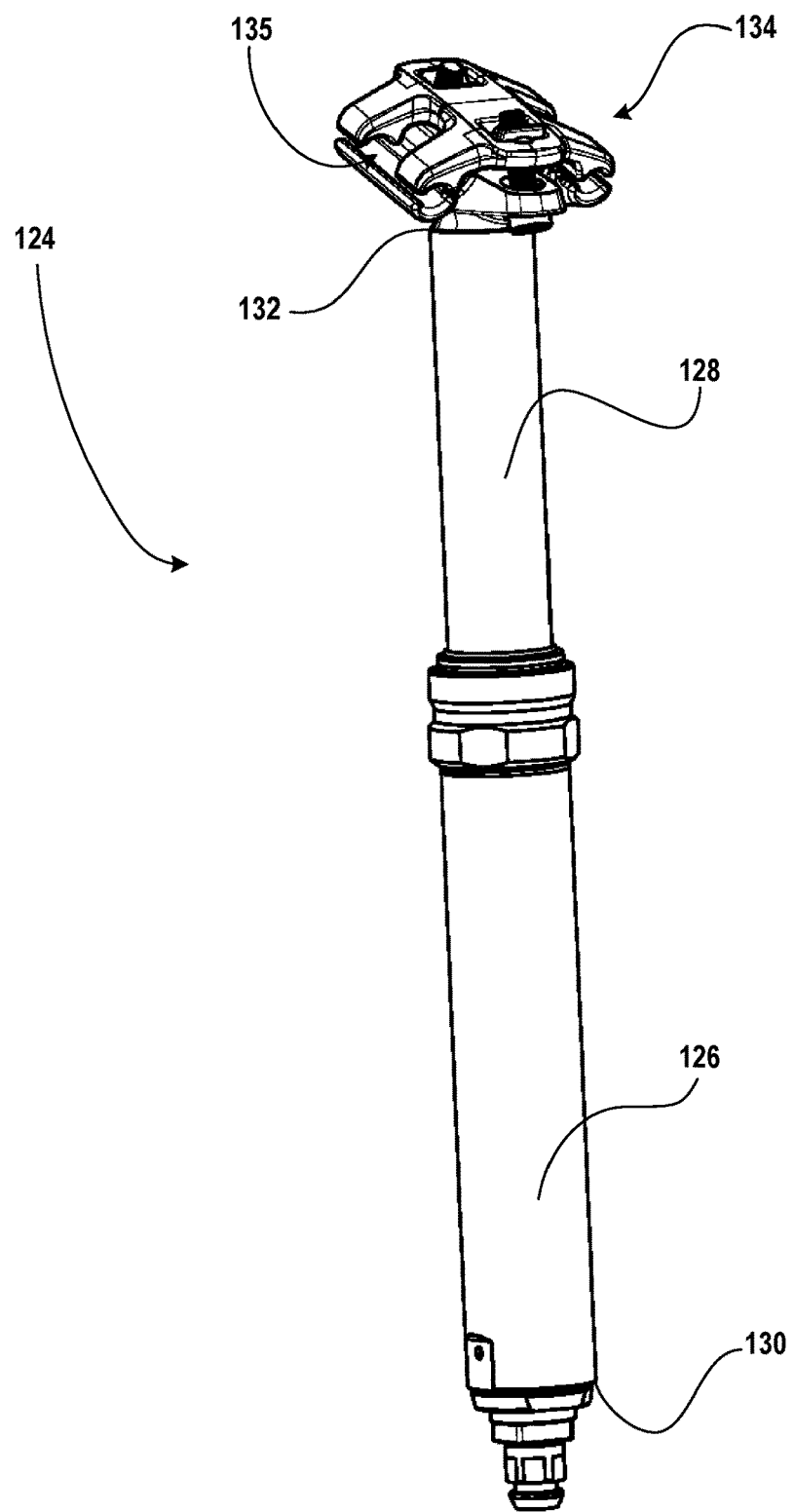
FIG. 2 is a perspective view of a seat post assembly constructed in accordance with the teachings of this disclosure, in a fully extended position.
Figure 3:
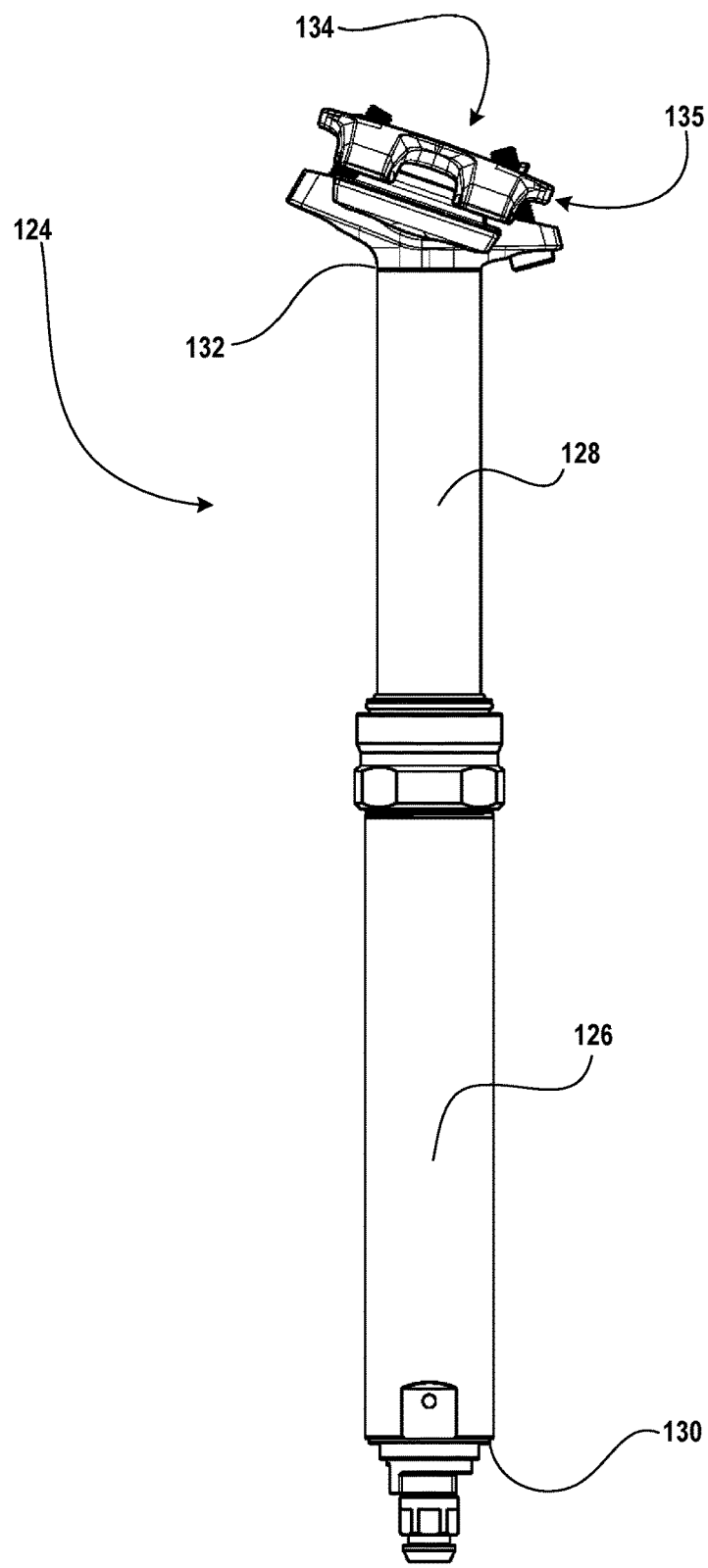
FIG. 3 is a side view of the seat post assembly of FIG. 2.

Referring to FIGS. 2 and 3, the seat post assembly 124 may be positioned in a fully extended position with the upper tube 128 extended upward relative to the lower tube 126 to a fullest extent. The distance between the first distal end 132 of the upper tube 128 and the second distal end 130 of the lower tube 126 may be at a maximum (e.g., the fully extended position or top out) when the upper tube 128 is in a first position relative to the lower tube 126.

Figure 4:
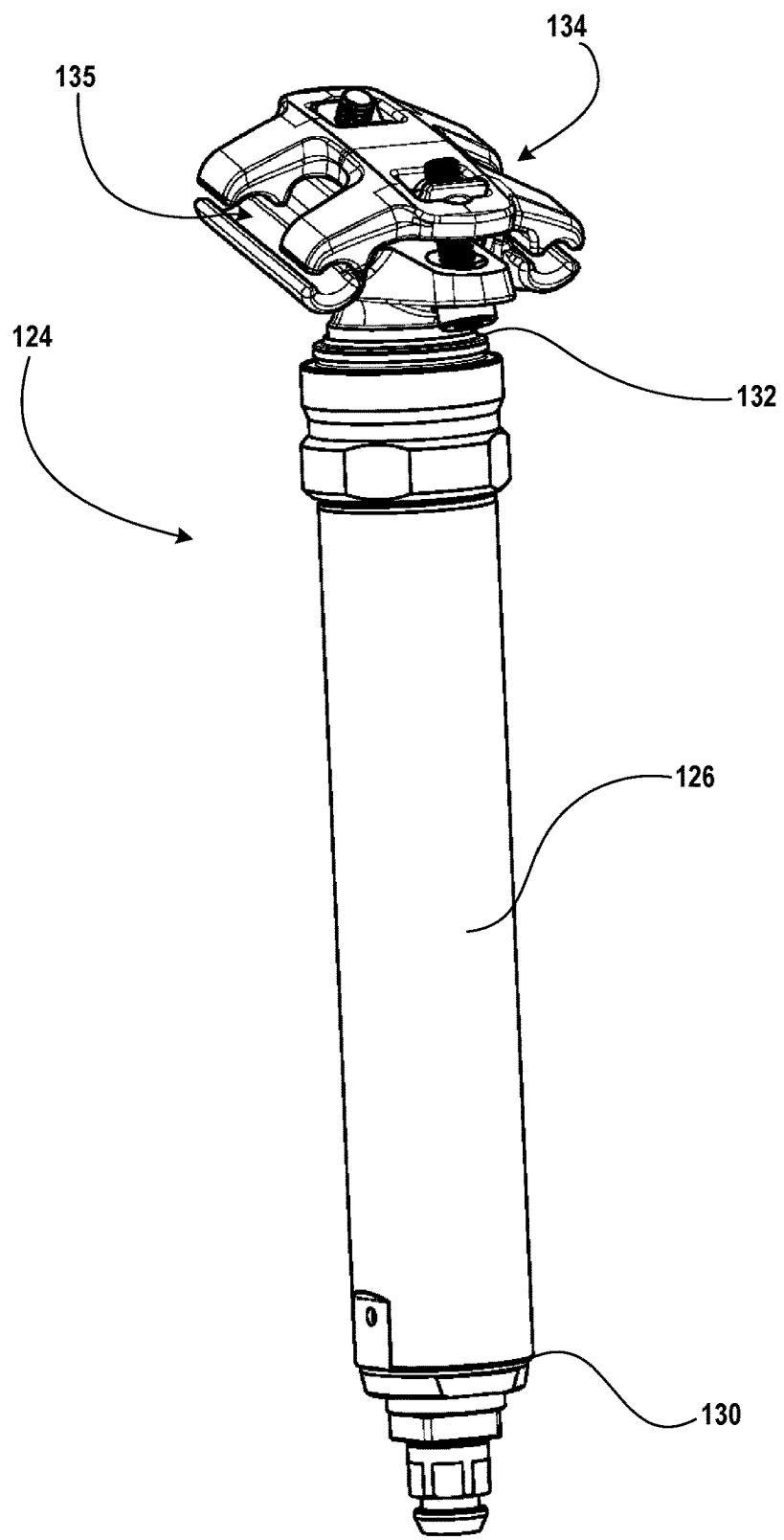
FIG. 4 is a perspective view of a seat post assembly constructed in accordance with the teachings of this disclosure, in a fully retracted position.
Figure 5:
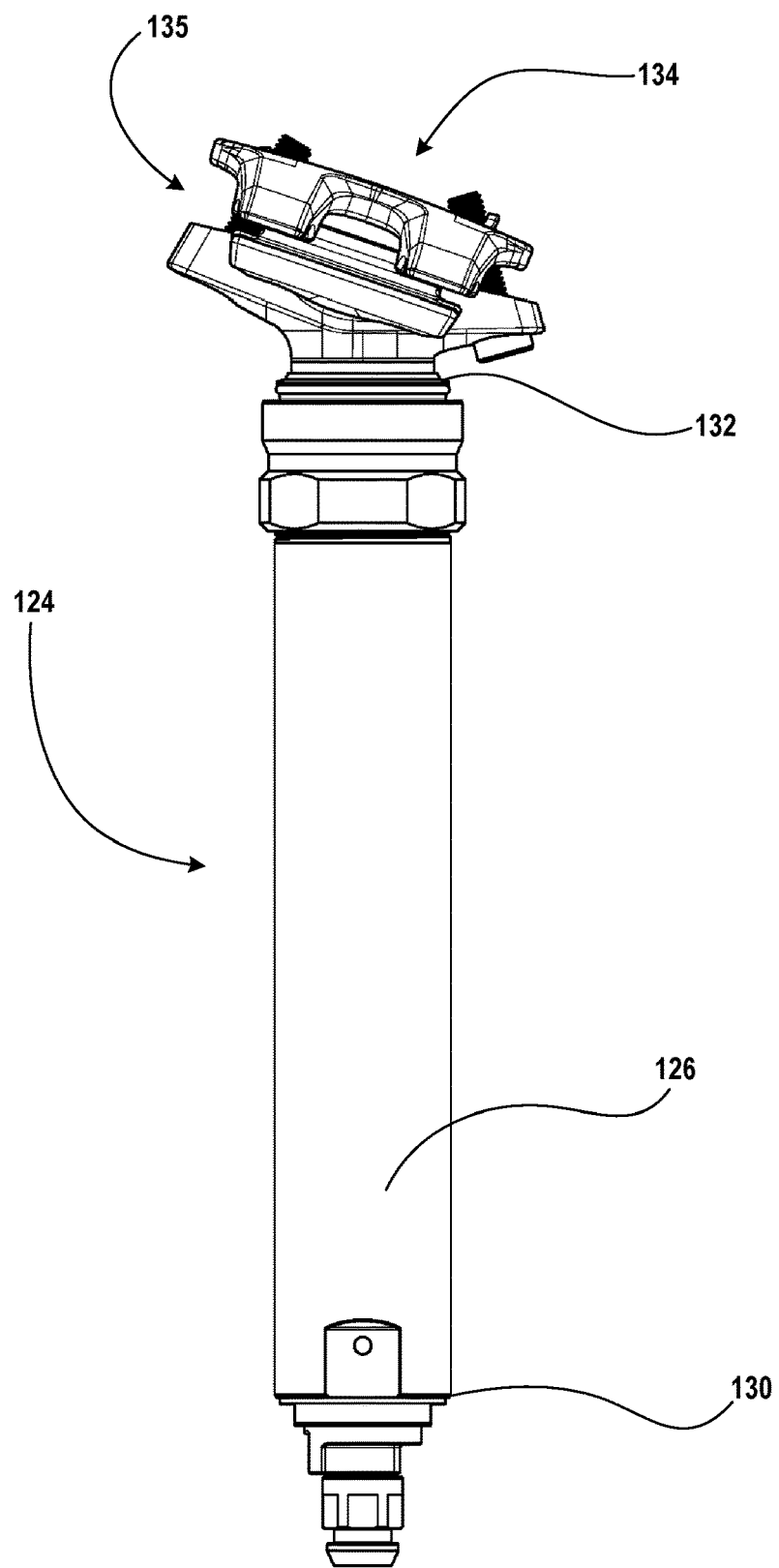
FIG. 5 is a side view of the seat post assembly of FIG. 4.
Figure 6:
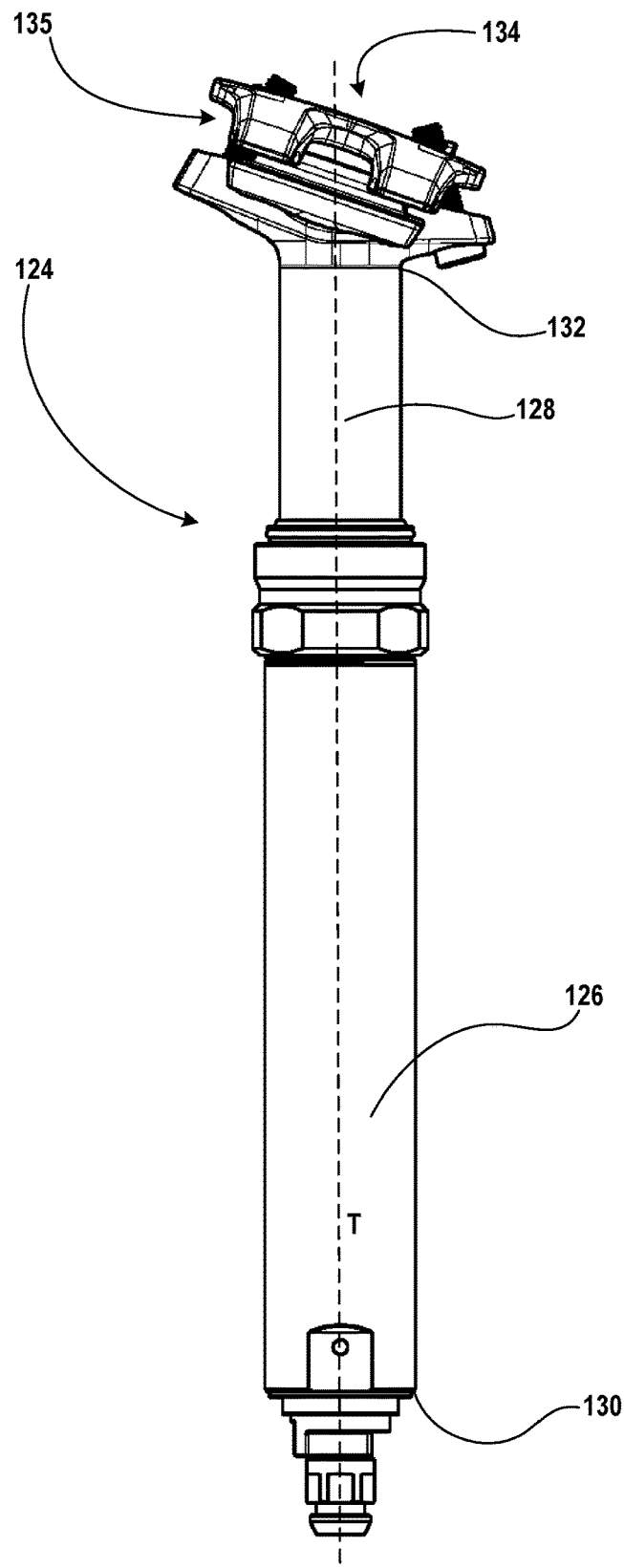
FIG. 6 is a side view of a seat post assembly constructed in accordance with the teachings of this disclosure, in an intermediate position.

Alternatively, referring to FIGS. 4 and 5, the seat post assembly 124 may be positioned in a fully retracted or contracted position with the upper tube 128 retracted into the lower tube 126 to a fullest extent. The distance between the first distal end 132 and the second distal end 130 may be at a minimum (e.g., the fully retracted position or bottom out) when the upper tube 128 is in a second position relative to the lower tube 126.

Raising or lowering the upper tube 128 relative to the lower tube 126 raises or lowers the seat or saddle 106 relative to the frame 102. The seat post assembly 124 may also be positioned in any number of intermediate positions (see FIG. 6) between the fully extended position and the fully contracted position, according to the desire of the rider.

How the height of the seat post assembly 124 is adjusted is now described below. Referring to FIGS. 7-12, the first distal end 132 of the upper tube 128 (e.g., a first end 132 of the upper tube 128) is threaded onto a boss 136 of the head 134. The boss 136 protrudes from a bottom of the head 134. A second end 138 of the upper tube 128, which is opposite the first end 132 of the upper tube 128, is threaded onto an outer portion 140 (e.g., a threaded outer portion) of a seal head 142. The upper tube 128 may be sealed from a surrounding environment (e.g., when valves are closed) with the boss 136 of the head 134 and the seal head 142.

The seat post assembly 124 has a single pressure system (e.g., a pneumatic pressure system). A compressible fluid or gas, such as air, is contained within a fluid volume of the pneumatic pressure system. In one embodiment, the fluid volume includes the compressible fluid or gas and an incompressible fluid. In such an embodiment, the fluid volume may be majority or primarily (e.g., greater than 80 percent by volume) compressible fluid or gas. In another embodiment, the fluid volume includes at least a majority incompressible fluid.

The fluid volume of the pneumatic pressure system includes multiple pneumatic chambers (e.g., volumes). The pneumatic pressure system in this example is pressurized with air via a valve 144 (e.g., a fill valve) in the head 134, at the first distal end 132 of the upper tube 128. In one example, the pneumatic pressure system may initially be pressurized to a preset or established pressure (e.g., with the seat post assembly 124 in the fully extended position shown in FIG. 7). The pneumatic pressure system may be pressurized such that when the seat post assembly 124 is in the fully contracted position and relative movement between the upper tube 128 and the lower tube 126 is allowed, the pneumatic pressure system causes the upper tube 128 to move relative to the lower tube 126, towards the fully extended position.

The pressurized medium, such as air, is contained within the multiple pneumatic chambers, which include at least a first pneumatic chamber 146, a second pneumatic chamber 148, and a third pneumatic chamber 150 in this example. The first pneumatic chamber 146 is, for example, a positive pressure chamber, the second pneumatic chamber 148 is a negative pressure chamber, and the third pneumatic chamber 150 is a residual pressure chamber. The first pneumatic chamber 146, the second pneumatic chamber 148, and the third pneumatic chamber 150 are pressure sealed chambers. The pressurized medium may be added to the pneumatic pressure system such that at least the first pneumatic chamber 146 and the third pneumatic chamber 150 are each pressurized at a respective predetermined or preset pressure.

The first pneumatic chamber 146, the second pneumatic chamber 148, and the third pneumatic chamber 150 may be any number of shapes and/or sizes. For example, the first pneumatic chamber 146, the second pneumatic chamber 148, and the third pneumatic chamber 150 may be cylindrically shaped (e.g., with outer diameters between 27 mm and 35 mm, respectively) and may be sized for a particular maximum post adjustment (e.g., 150 mm).

A portion of a piston 152 (e.g., a piston head 154) is received within an interior of the upper tube 128. The piston head 154 is disposed at an upper end of the piston 152. A piston shaft 155 is threadably connected to a stem 156 that protrudes from the piston head 154 in a direction away from the head 134. The piston shaft 155 extends through the seal head 142. An end cap 158 is threaded into or onto a lower end of the piston shaft 155. The end cap 158 may include, for example, a vent or check valve 159 (e.g., a vent and fill valve). The vent and fill valve 159 may be used to vent and/or add fluid (e.g., gas; air) to, for example, the third pneumatic chamber 150.

The end cap 158 is received in a bore 160 at the second distal end 130 of the lower tube 126. The bore 160 terminates at a step or shoulder 162, and the end cap 158 butts against the shoulder 162. In one embodiment, the end cap 158 is captured between the shoulder 162 and a retaining ring within a lower end (e.g., the second distal end 130) of the lower tube 126, securing the end cap 158 therein.

The first pneumatic chamber 146 includes a volume within the upper tube 128, between the head 134 and the piston head 154 of the piston 152 (e.g., a side of the piston head 154 facing the head 134). The second pneumatic chamber 148 includes a volume within the upper tube 128, between the seal head 142 and the piston head 154 of the piston (e.g., a side of the piston head 154 facing away from the head 134). In other words, the first pneumatic chamber 146 and the second pneumatic chamber 148 are disposed within the upper tube 128 and separated by the piston head 154 of the piston 152. The third pneumatic chamber 150 includes a volume within the lower tube 126, around the piston shaft 155, and between the seal head 142 and the end cap 158 received in the bore 160 of the lower tube 126.

Figure 8:
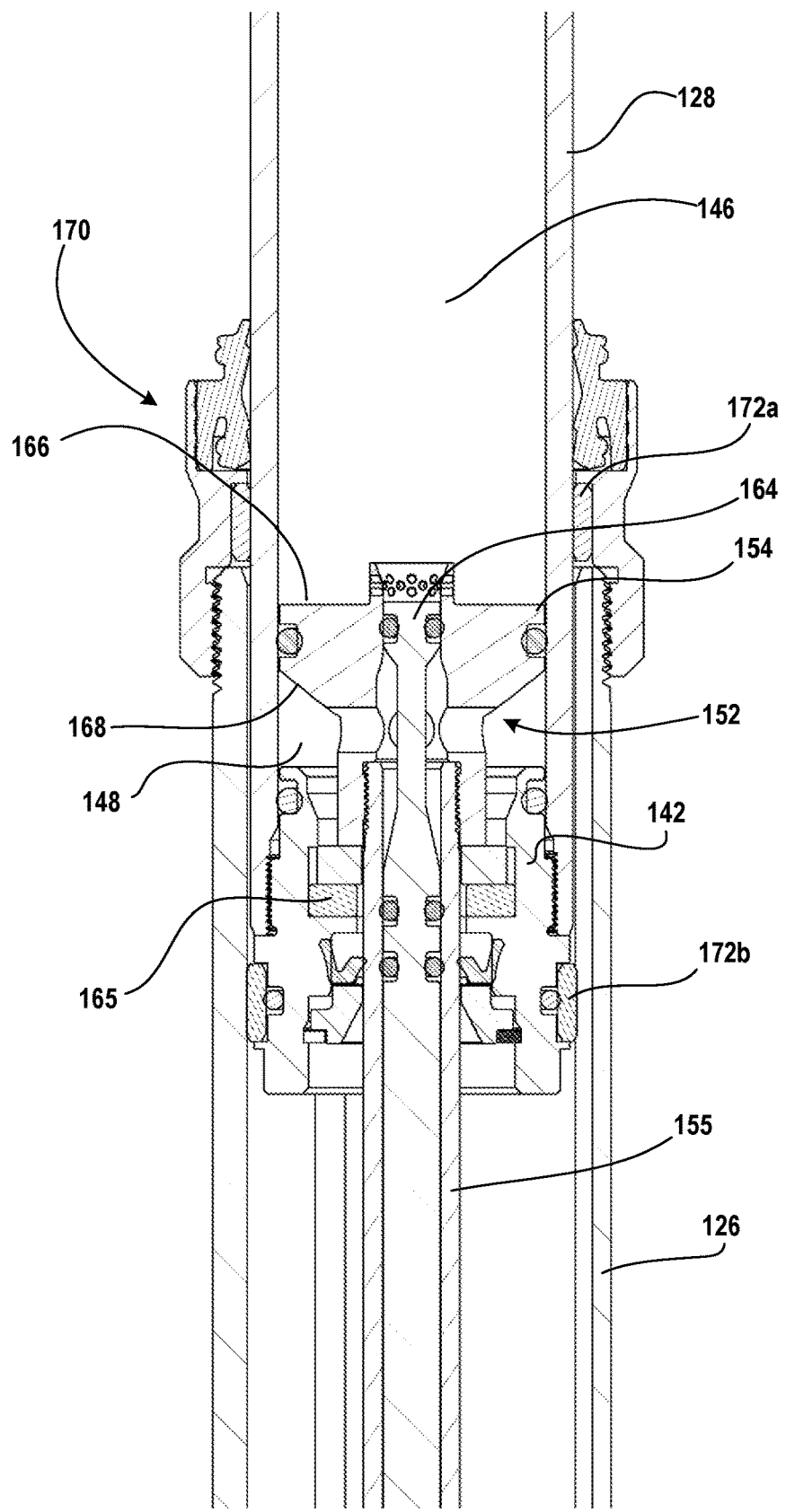
FIG. 8 is a close-up side cross-section of a portion of the first seat post assembly of FIG. 7.

Referring to FIG. 8, the piston 152 includes a valve 164 (e.g., an actuator valve with an isolator) that is disposed within the piston head 154 and the piston shaft 155. A portion of the actuator valve 164 (e.g., the isolator) is movable relative to the piston head 154 and the piston shaft 155 between an open position and a closed position. The first pneumatic chamber 146 and the second pneumatic chamber 148 are fluidly coupleable via the actuator valve 164. For example, the first pneumatic chamber 146 and the second pneumatic chamber 148 are fluidly coupled when the actuator valve 164 is open, and the first pneumatic chamber 146 and the second pneumatic chamber 148 are not fluidly coupled when the actuator valve 164 is closed.

Figure 7:
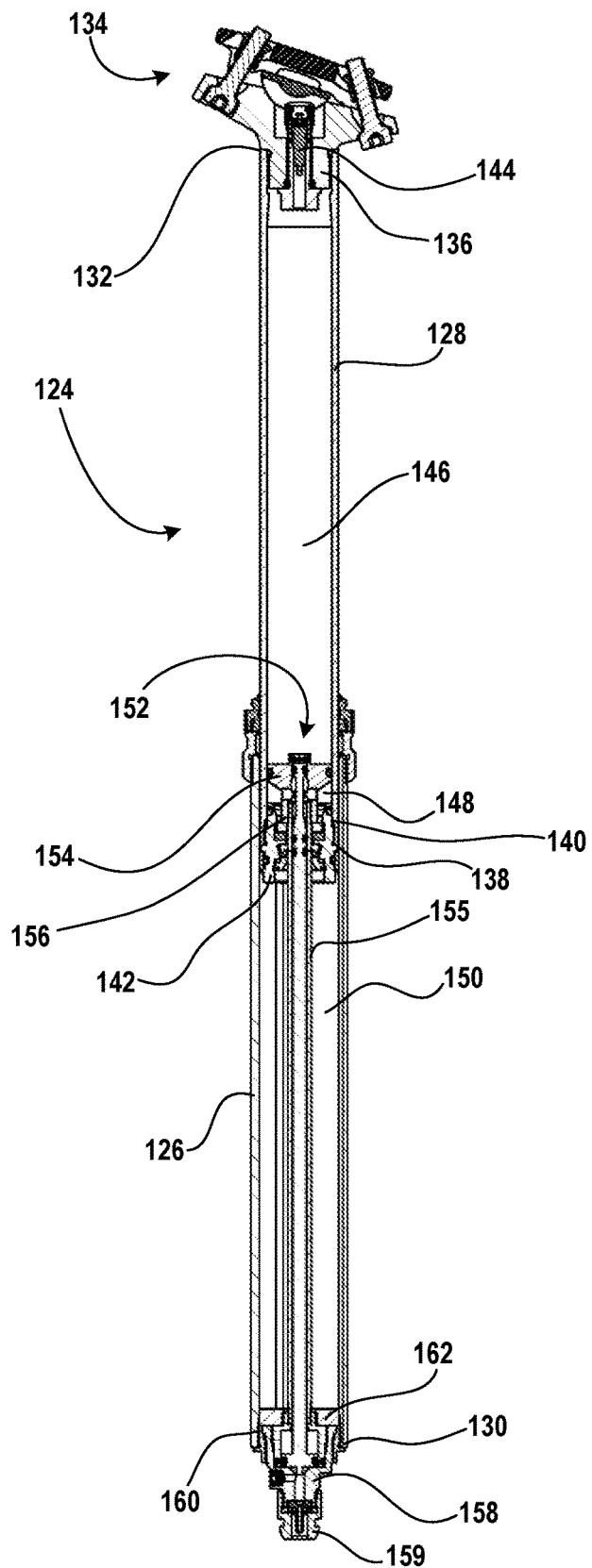
FIG. 7 is a side cross-section of a first seat post assembly constructed in accordance with the teachings of this disclosure, in a fully extended position.

FIGS. 7 and 8 illustrate the fully extended position of the seat post assembly 124. Referring to FIG. 8, the fully extended position of the seat post assembly 124 may also correspond to the top out position where the piston 152 is in in contact with (e.g., abuts) the seal head 142. The seal head 142 may include a stop 165 (e.g., a bumper) made of a flexible material (e.g., rubber) against which the piston 152 (e.g., the piston head 154) abuts when the seat post assembly 124 is in the top out position. The seal head 142 may include additional components such as, for example, gaskets that help seal, for example, the first pneumatic chamber 146.

The piston head 154 of the piston 152 has a first side 166 that faces the head 134, and a second side 168 opposite the first side 166. The second side 168 of the piston head 154 faces in a direction towards the seal head 142. In other words, the first side 166 of the piston head 154 partially forms the first pneumatic chamber 146, and the second side 168 of the piston head 154 partially forms the second pneumatic chamber 148. The volume of the first pneumatic chamber 146 and the volume of the second pneumatic chamber 148 are based on a position of the piston head 154 of the piston 152 relative to the upper tube 128. In the example shown in FIGS. 7 and 8, the first pneumatic chamber 146 and the second pneumatic chamber 148 are both within the upper tube 128 of the seat post assembly 124. Other configurations may be provided.

An axial surface area of the first side 166 of the piston head 154 is greater than an axial surface area of the second side 168 of the piston head 154. The axial surface area of the first side 1667 of the piston head 154 and the axial surface area of the second side 168 of the piston head 154 may be surface areas as viewed along the tube axis T, respectively. When the valve 164 is in the closed position and the seat post assembly 124 is in the fully extended position, the first pneumatic chamber 146 is configured to act as a spring configured to bias the upper tube 128 towards the fully extended position of the seat post assembly 124. In other words, when the valve 164 is in the closed position and the seat post assembly 124 is in the fully extended position, a portion of the compressible fluid within the pneumatic pressure system (e.g., the portion of the compressible fluid within the first pneumatic chamber 146) acts as a spring configured to bias the upper tube 128 towards the fully extended position of the seat post assembly 124.

The first side 166 and the second side 168 of the piston head 154 are sized and shaped, and the first pneumatic chamber 146 and the second pneumatic chamber 148 are respectively pressurized when the seat post assembly 124 is in the fully extended position, such that the fluid (e.g., air) within the first pneumatic chamber 148 supports the rider. The saddle 106 may sag less than 10 mm as a result of the weight of the rider on the saddle 106 when the seat post assembly is in the fully extended position.

The seat post assembly 124 operates because the axial surface area of the first side 166 of the piston head 154 versus a pneumatic pressure ratio between the first pneumatic chamber 146 and the second pneumatic chamber 148 holds up the rider based on the force calculation. This is also dependent on the volume of the second pneumatic chamber 148 at the fully extended position of the seat post assembly 124.

In the example shown in FIGS. 7-12, the volume of the first pneumatic chamber 146 is greater than the volume of the second pneumatic chamber 148 when the seat post assembly 124 is in the fully extended position. For example, the volume of the second pneumatic chamber 148 may be no more than twenty percent of the volume of the first pneumatic chamber 146 when the seat post assembly 124 is in the fully extended position. Other percentages may be provided. For example, the volume of the second pneumatic chamber 148 may be no more than ten percent, five percent, or three percent of the volume of the first pneumatic chamber 146 when the seat post assembly 124 is in the fully extended position.

In one embodiment, the portion of the compressible fluid within the second pneumatic chamber 148 is much smaller than a portion of the compressible fluid within the first pneumatic chamber 146 when the seat post assembly 124 is in the fully extended position. For example, the portion of the compressible fluid within the second pneumatic chamber 148 is less than three percent or even less than one percent of the compressible fluid by volume within the first pneumatic chamber 146 when the seat post assembly 124 is in the fully extended position. In another embodiment, an incompressible fluid (e.g., hydraulic oil) at least partially (e.g., completely) fills the second pneumatic chamber 148 when the seat post assembly 124 is in the fully extended position, such that an even larger portion of the compressible fluid (e.g., 99%, 99.5%, or more) is disposed within the first pneumatic chamber 146 when the seat post assembly 124 is in the fully extended position. In one example of this embodiment, a first portion of the incompressible fluid completely fills the second pneumatic chamber 148 and the first pneumatic chamber 146 includes a second portion of the incompressible fluid when the seat post assembly 124 is in the fully extended position.

When the seat post assembly 124 is in the fully extended position, the volume of the second pneumatic chamber 148 is to be minimized to allow for the second pneumatic chamber 148 to depressurize quickly (e.g., in less than 5 mm; in less than 1-2 mm). The volume of the second pneumatic chamber 148 when the seat post assembly 124 is in the fully extended position may be any number of different sizes. For example, for a seat post assembly 124 that includes an upper tube 128 having an inner diameter of 20.8 mm and a piston shaft 155 having a diameter of 7.5 mm, the volume of the second pneumatic chamber 148 may be between 0.5 ml and 3.0 ml or 5.0 ml (e.g., 0.80 ml or 0.83 ml) and the volume of the first pneumatic chamber 146 may be between 40 ml and 83 ml (e.g., 81.5 ml) when the seat post assembly 124 is in the fully extended position.

A length of the first pneumatic chamber 146 when the seat post assembly 124 is in the fully extended position, the inner diameter of the upper tube 128, and/or a size and/or shape of the second pneumatic chamber 148 may be configured, such that a percentage of the volume of the second pneumatic chamber 148 relative to the volume of the first pneumatic chamber 146, in the fully extended position, is less than, for example, ten percent, five percent, three percent, or one percent (e.g., 0.98%). This makes the seat post assembly 124 act like a zero negative pressure preloaded pneumatic spring. This is the principal that holds up the rider with a feel the rider experiences as being rigid. At the fully extended position of the seat post assembly 124, the saddle 106 may be moving, but this movement is not perceivable to the rider.

A total chamber volume (e.g., the volume of the first pneumatic chamber 146 plus the volume of the second pneumatic chamber 148) is variable based on the position of the piston head 154 of the piston 152 relative to the upper tube 128. For example, the total chamber volume is largest when the seat post assembly 124 is in the fully extended position and is smallest when the seat post assembly 124 is in the fully contracted position. In other words, the total chamber volume decreases as the upper tube 128 moves relative to the lower tube 126 from the fully extended position of the seat post assembly 124 to the fully contracted position of the seat post assembly 124.

When a rider is not seated on the saddle 106 and the actuator valve 164 is open, the balance of forces in the system is such that the axial pressure force acting on the first side 166 of the piston head 154 is greater than the axial pressure force acting on the second side 168 of the piston head 154. In the open position, the isolator of the actuator valve 164, for example, is positioned such that fluid may flow through the flow path between the first pneumatic chamber 146 and the second pneumatic chamber 148. The axial pressure force imbalance biases the seat post assembly 124 towards the fully extended position.

When a force is applied to the first distal end 132 of the upper tube 128 (e.g., via the saddle 106), air, for example, is forced out of the first pneumatic chamber 146 and into the second pneumatic chamber 148, and the head 134 and the upper tube 128, along with all other parts fixed to the head 134 and the upper tube 128, are pushed downward to accommodate the resulting increase in fluid volume in the second pneumatic chamber 148. With the applied force, the rider may lower the saddle 106 and the upper tube 128 to the fully contracted position of FIGS. 9 and 10 or, if desired, may adjust the saddle 106 to a lesser intermediate height (see FIGS. 11 and 12).

The actuator valve 164 may be closed at the desired position of the upper tube 128 relative to the lower tube 126 to prevent or limit further relative motion between the upper tube 128 and the lower tube 126. When the actuator valve 164 is closed, the balance of forces in the system is such that the axial pressure force acting on the first side 166 of the piston head 154 is approximately equal to the axial pressure force acting on the second side 168 of the piston head 154. When the seat post assembly 124 is in an intermediate position, the saddle 106 may sag as a result of the weight of the rider, but this sag may be 30 mm or less.

Figure 9:
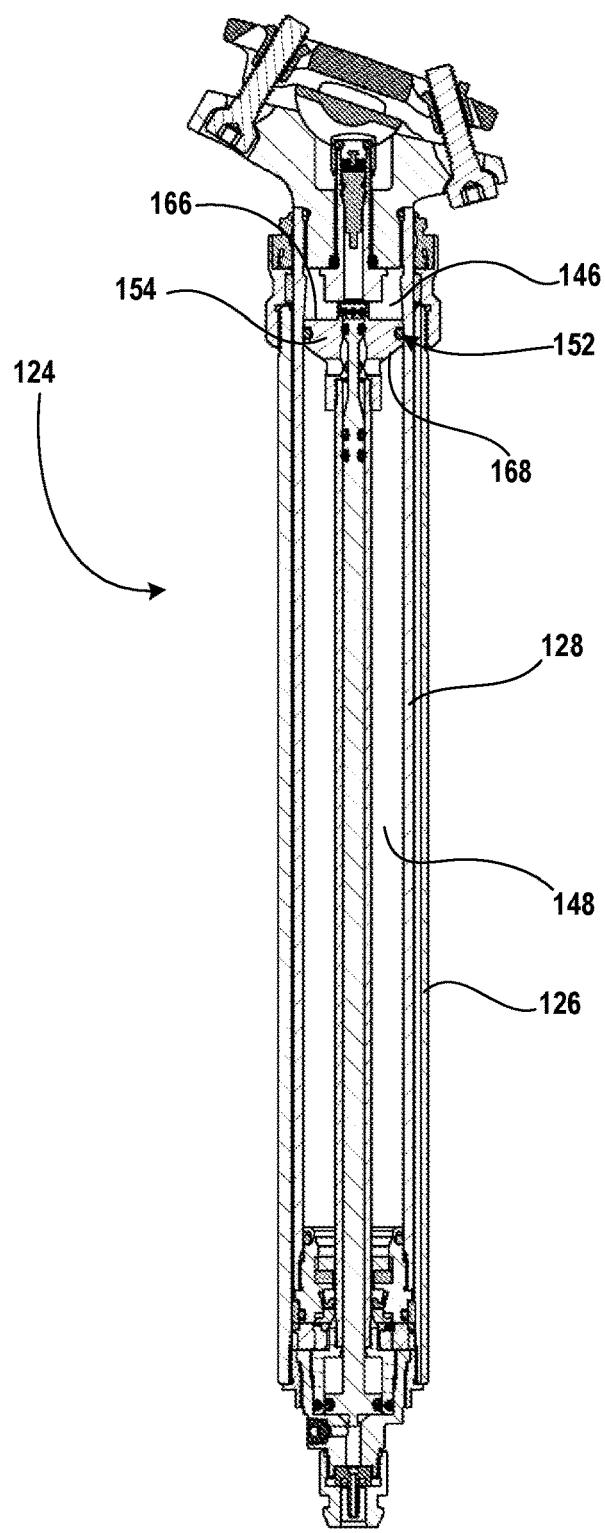
FIG. 9 is a side cross-section of the first seat post assembly of FIG. 7 in a fully retracted position.
Figure 10:
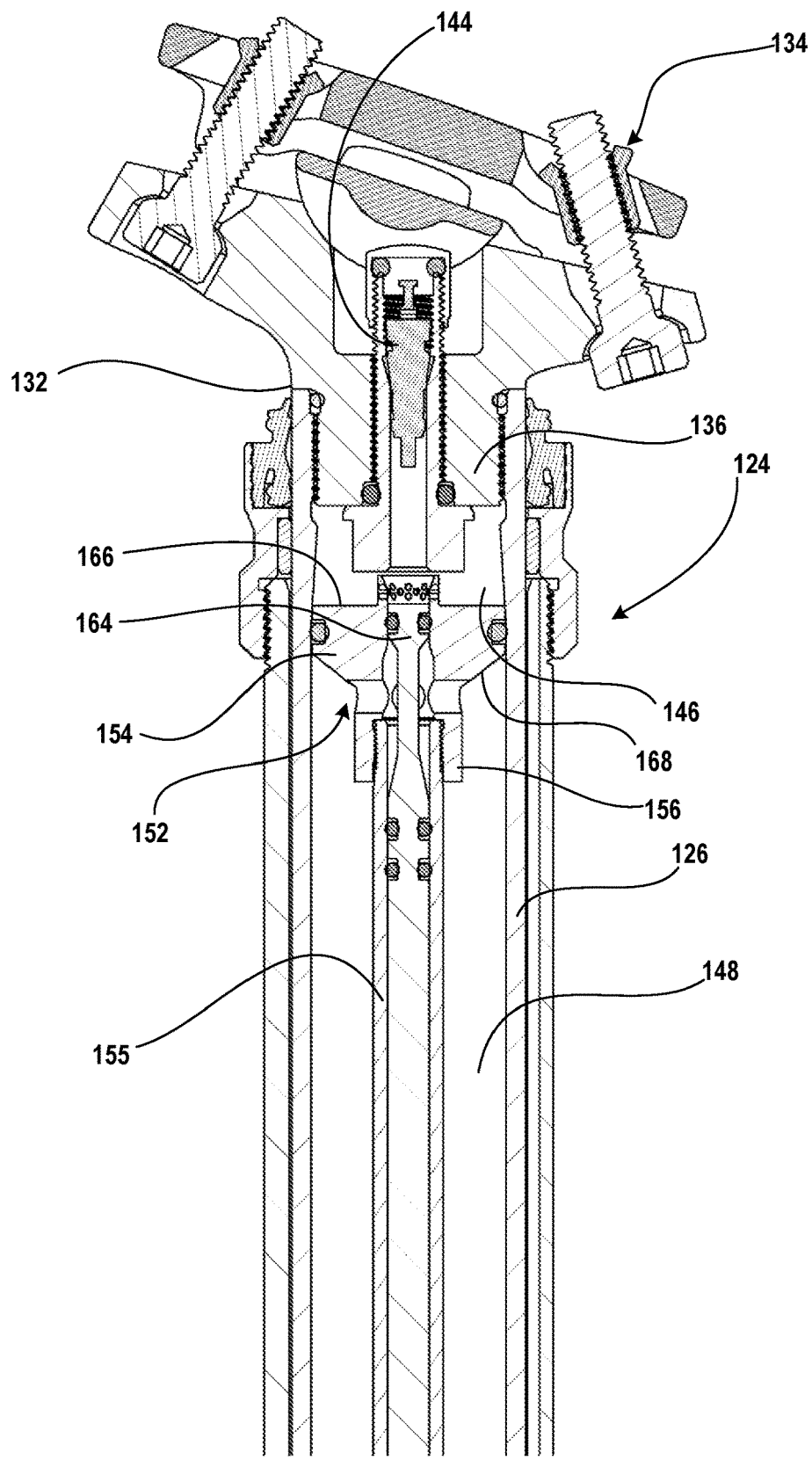
FIG. 10 is a close-up side cross-section of a portion of the first seat post assembly of FIG. 9.
Figure 11:
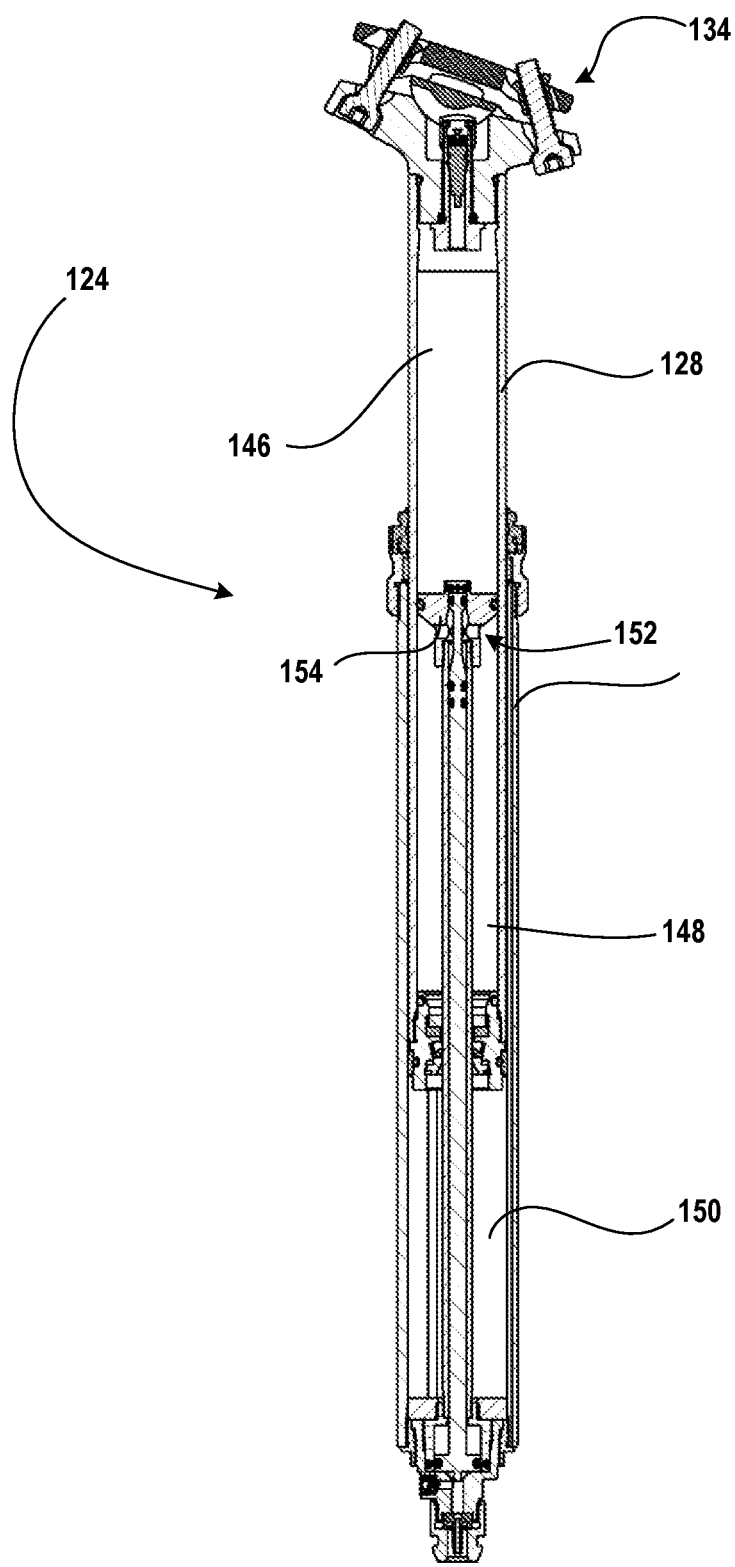
FIG. 11 is a side cross-section of the first seat post assembly of FIG. 7 in an intermediate position.
Figure 12:
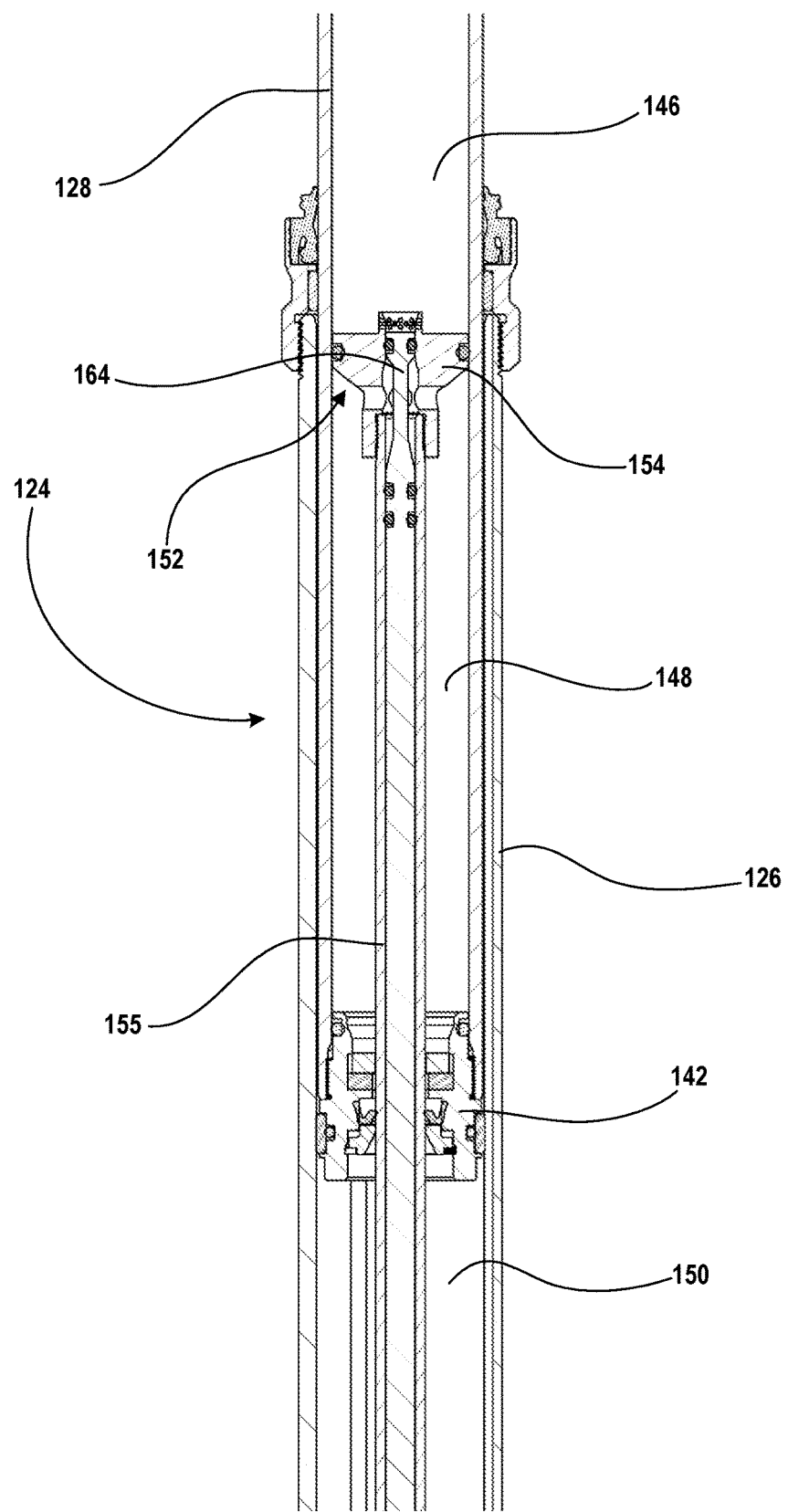
FIG. 12 is a close-up side cross-section of a portion of the first seat post assembly of FIG. 11.

FIGS. 9 and 10 show the seat post assembly 124 in the fully retracted position. The concept discussed above with respect to the volume of the second pneumatic chamber 148 being minimized when the seat post assembly 124 is in the fully extended position applies, but in reverse, when the seat post assembly 124 is in the fully retracted position. The volume of the first pneumatic chamber 146 is minimized (e.g., 1.0 ml to 3.0 ml, 5.0 ml, 8.0 ml, or 15.0 ml; 1.29 ml) when the seat post assembly 124 is in the fully retracted position so that the rider perceives the saddle 106 as being rigid. In the fully retracted position, the volume of the second pneumatic chamber 148 may be any number of sizes (e.g., 30 ml to 60 ml). The minimization of the size of the first pneumatic chamber 146 when the seat post assembly 124 is in the fully retracted position allows the rider to grab the bicycle 100 by the saddle 106 or the upper tube 128 of the seat post assembly 124 (e.g., during maintenance) without the upper tube 128 extending relative to the lower tube 126.

Other volumes of the first pneumatic chamber 146 and the second pneumatic chamber 148 at the fully extended position of the seat post assembly 124 and the fully retracted position of the seat post assembly 124, respectively, may be provided. For example, at the fully extended position of the seat post assembly 124, the volume of the second pneumatic chamber 148 may be 1.29 ml, and the volume of the first pneumatic chamber 146 may be 41.39 ml, 49.88 ml, 59.40 ml, 70.27 ml, or 81.48 ml. At the fully retracted position of the seat post assembly 124, alternative combinations of the volume of the first pneumatic chamber 146 and the volume of the second pneumatic chamber 148 may respectively include: 7.41 ml and 30.39 ml; 7.40 ml and 37.78 ml; 8.43 ml and 45.17 ml; 10.81 ml and 52.56 ml; and 13.52 ml and 47.50 ml. Other combinations may be provided.

The piston head 154 may be any number of sizes and/or shapes to minimize the volume of the second pneumatic chamber 148 when the seat post assembly 124 is in the fully extended position. The shape and the size of the second side 168 (e.g., providing a corresponding axial surface area) of the piston head 154 may be configured based on a force calculation with the goal of supporting the rider without suspensioning or gapping when the seat post assembly 124 is in the fully extended position and the fully retracted position. Additionally, the second side 168 of the piston head 154 may be sized and shaped to minimize the volume of the second pneumatic chamber 148 when the seat post assembly 124 is in the fully extended position.

Figure 13:
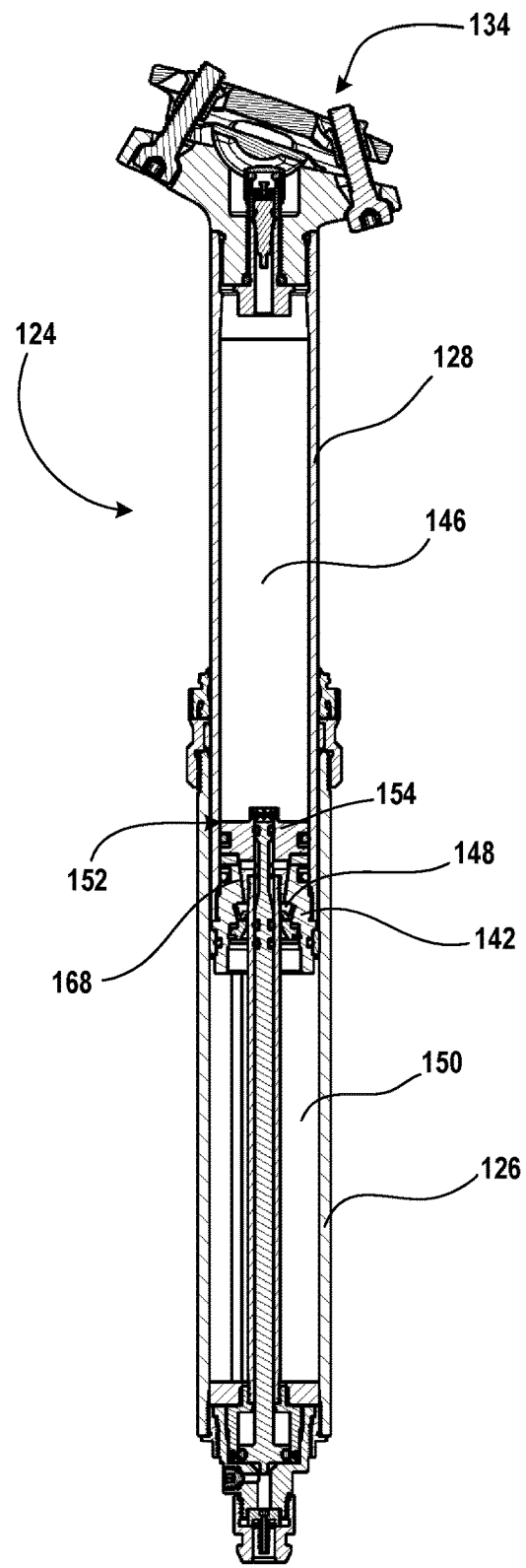
FIG. 13 is a side cross-section of a second seat post assembly constructed in accordance with the teachings of this disclosure, in a fully extended position.
Figure 14:
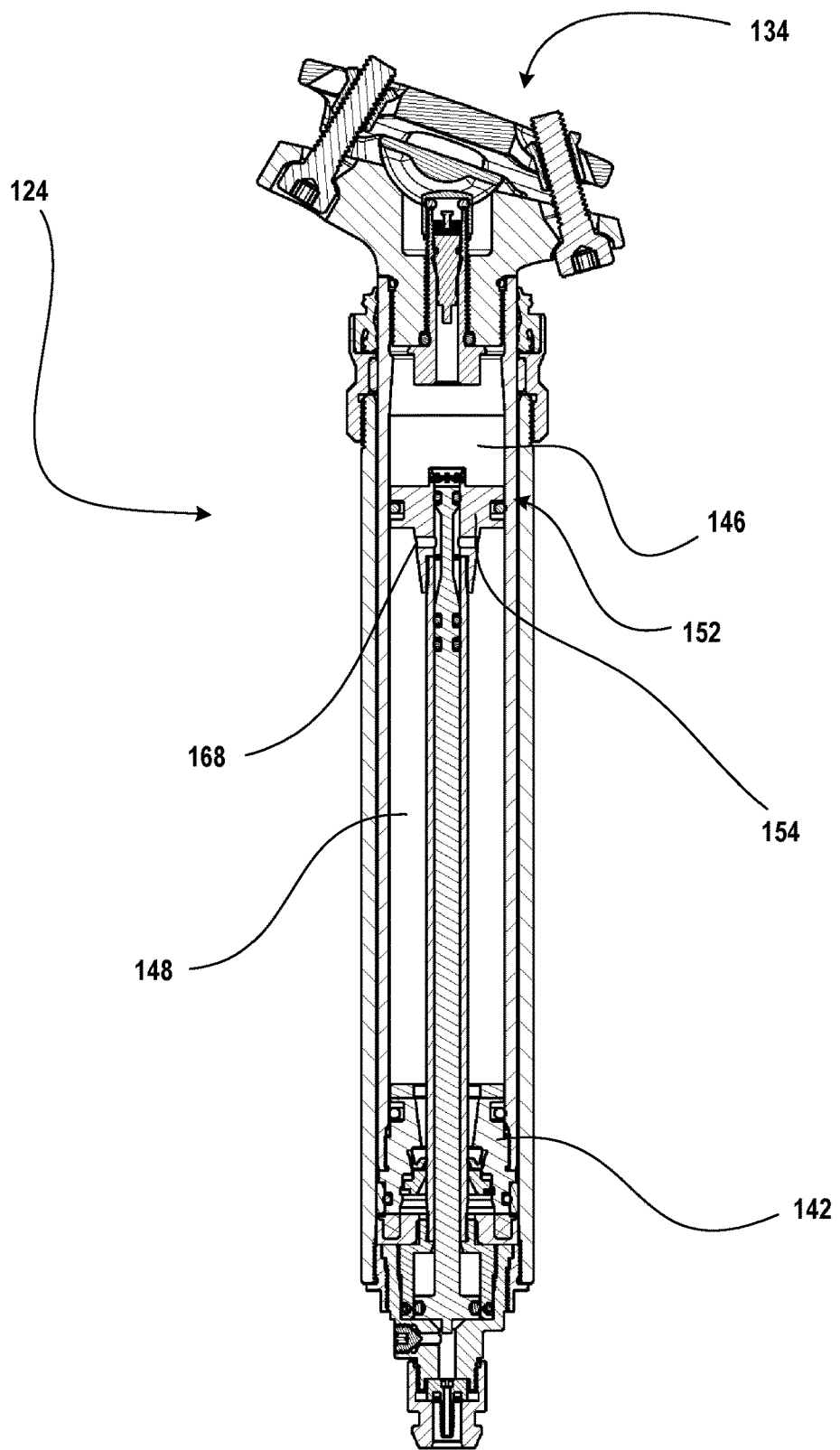
FIG. 14 is a side cross-section of the second seat post assembly of FIG. 13 in a fully retracted position.
Figure 15:
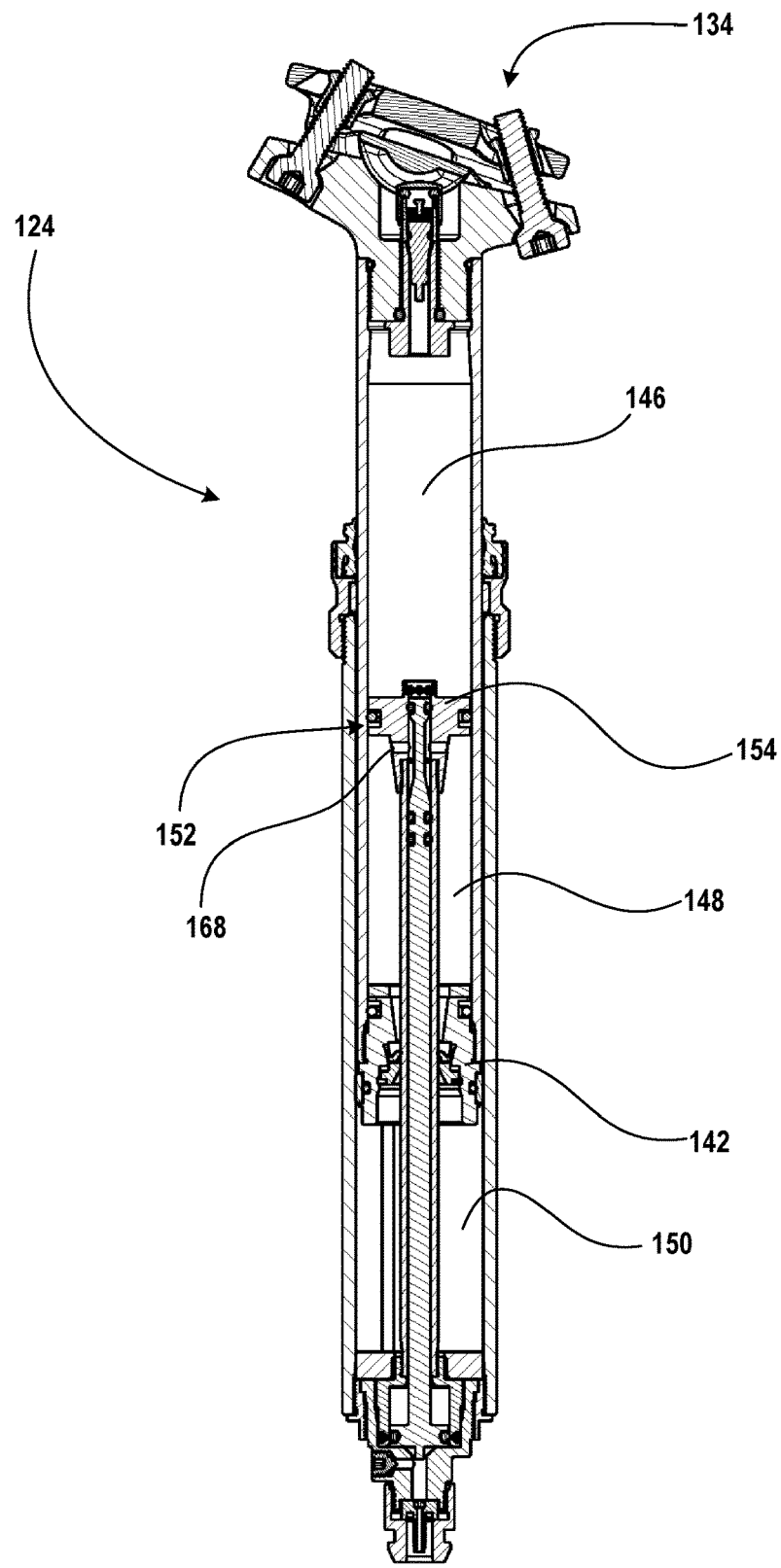
FIG. 15 is a side cross-section of the second seat post assembly of FIG. 14 in an intermediate position.

Referring to FIGS. 7-12, the second side 168 of the piston head 154 includes a portion that is angled relative to the first side 166 of the piston head 154, such that the piston head 154 is a conical frustum. The volume of the second pneumatic chamber 148 when the seat post assembly 124 is in the fully extended position may be minimized using different sizes and shapes of the second side 168 of the piston head 154. Referring to FIGS. 13-15, the volume of the second pneumatic chamber 148 when the seat post assembly 124 is in the fully extended position may be minimized by the size and shape of the second side 168 of the piston head 154 partially corresponding to (e.g., matching) the size and shape of a portion of the seal head 142 facing the piston head 154. For example, referring to FIG. 13, the volume of the second pneumatic chamber 148 is smaller, when the seat post assembly 124 is in the fully extended position, compared to the example shown in FIGS. 7-12.

Figure 16:
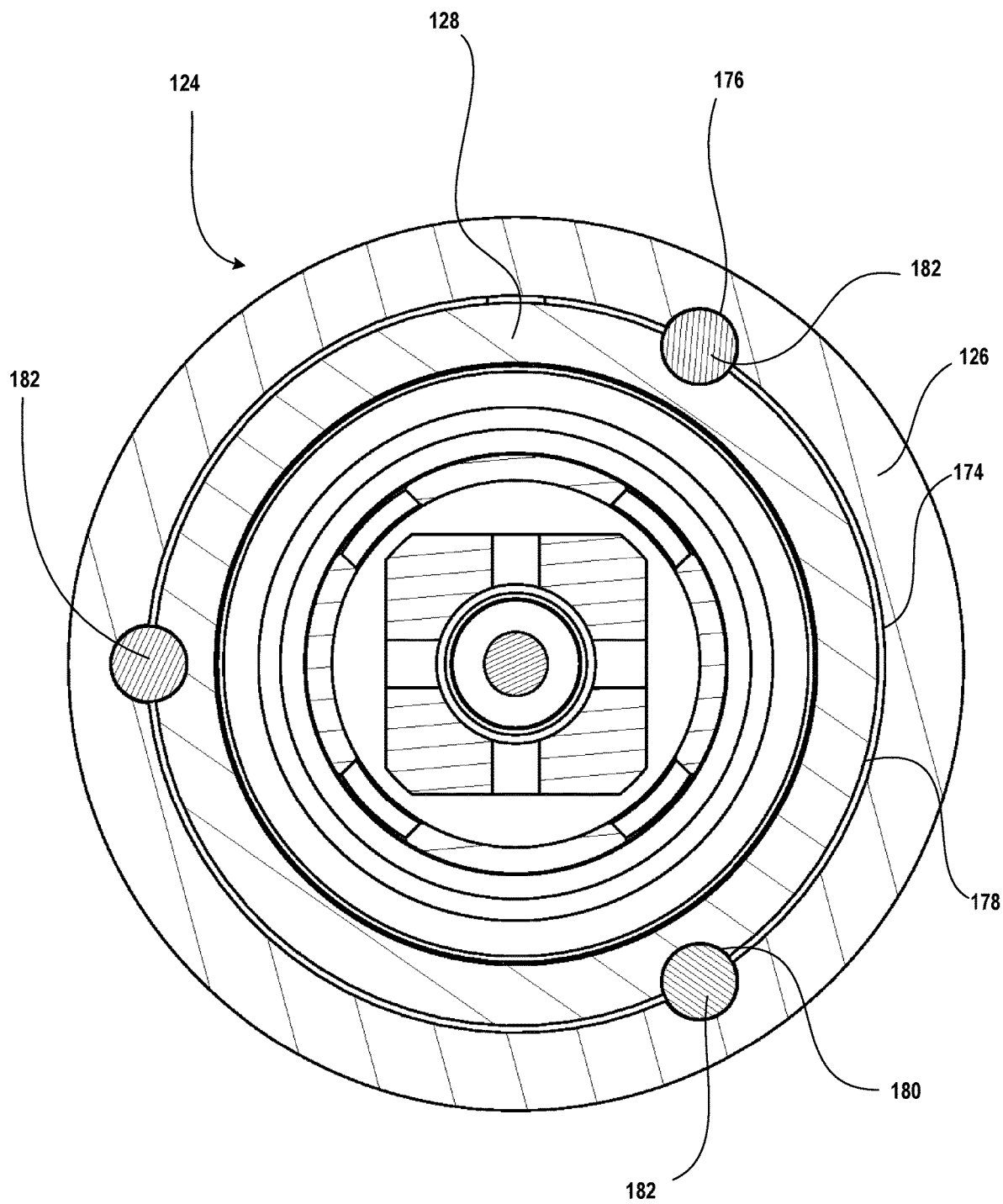
FIG. 16 is a top cross-section of the first seat post assembly of FIG. 7.

As shown in FIGS. 8 and 16, the seat post assembly 124 includes additional components that facilitate proper relative motion of the upper tube 128 relative to the lower tube 126 of the seat post assembly 124. Referring to FIG. 8, a collar 170 is threadably connected to the upper end of the lower tube 126 and closely surrounds the upper tube 128. The lower tube 126, the collar 170, the piston 152, the piston shaft 155, and the end cap 158 are essentially fixed relative to one another and thus are constrained to not move relative to each other. Since the lower tube 126 is clamped in the frame tube 133 of the bicycle frame 102, these components will always be in the same fixed position relative to the bicycle frame 102. The head 134 and the upper tube 128 are fixed to one another and thus are constrained to always move together as a unit. These parts telescope vertically within and relative to the lower tube 126 along the tube axis.

The seat post assembly 124 also includes one or more bushings 172 to facilitate the relative motion between the upper tube 128 and the lower tube 126. For example, the collar 170 includes a first bushing 172a, and the seal head 142 includes a second bushing 172b. The first bushing 172a and the second bushing 172b, for example, reduce friction between the upper tube 128 and the lower tube 126 during relative movement. An inner annular surface of the first bushing 172a slides along an outer annular surface of the upper tube 128, and an outer annular surface of the second bushing 172b slides long an inner annular surface of the lower tube 126. The seat post assembly 124 may include more, fewer, and/or different bushings.

Referring to FIG. 16, the seat post assembly 124 includes one or more anti-rotation features that prevents rotation of the upper tube 128 relative to the lower tube 126 about an axis of rotation that extends axially relative to the upper tube 128 and the lower tube 126. For example, the inner annular surface 174 of the lower tube 126 includes one or more recesses 176 (e.g., one or more grooves or slots), and the outer annular surface 178 of the upper tube 128 includes one or more recesses 180 (e.g., slots or grooves). In the example of FIG. 16, the inner annular surface 174 of the lower tube 126 includes three grooves 176 uniformly distributed around the inner annular surface 174 of the lower tube 126, and the outer annular surface 178 of the upper tube 128 includes three slots 180 uniformly distributed around the outer annular surface 178 of the upper tube 128. More, fewer, and/or different recesses 176, 180 may be provided.

One or more keys 182 (e.g., three keys 182) are disposed within the one or more grooves 176 and the one or more slots 180, respectively. The three keys 182, for example, may be captive within the three slots 180 within the upper tube 128 and may slide along the three grooves 176 within the lower tube 126 with movement of the upper tube 128 relative to the lower tube 126. The one or more keys 182 may be any number of sizes and/or shapes. For example, each of the one or more keys 182 may be cylindrical in shape or be capsules in shape. Each of the one or more keys 182 may extend a distance along the axial direction to prevent relative rotation between the upper tube 128 and the lower tube 126. Other configurations may be provided.

Figure 17:
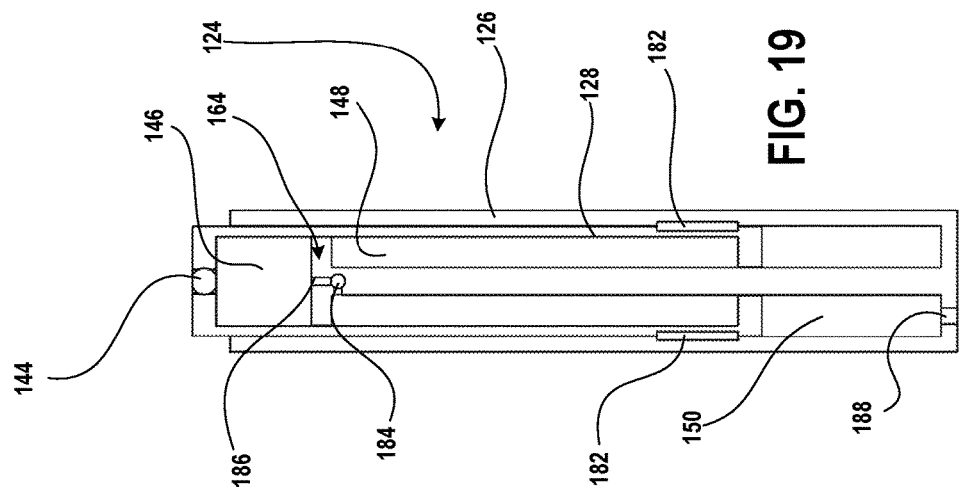
FIG. 17 is a simplified schematic diagram of the first seat post assembly of FIG. 7 in a fully extended position, with an anti-rotation feature.
Figure 18:
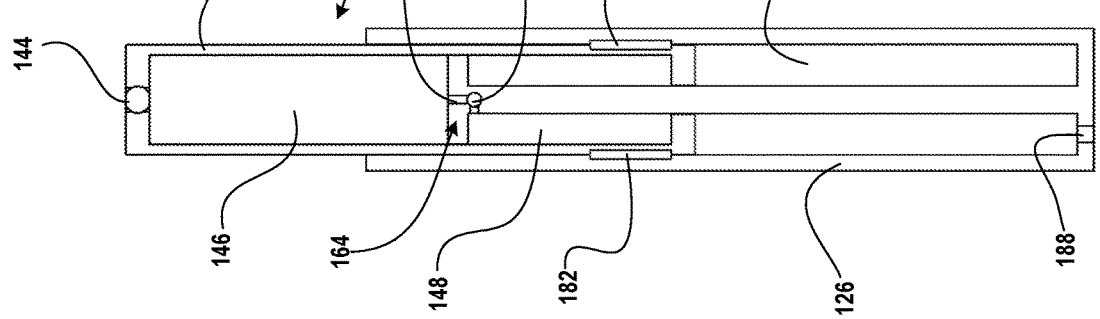
FIG. 18 is a simplified schematic diagram of the first seat post assembly of FIG. 17, in an intermedia position.
Figure 19:
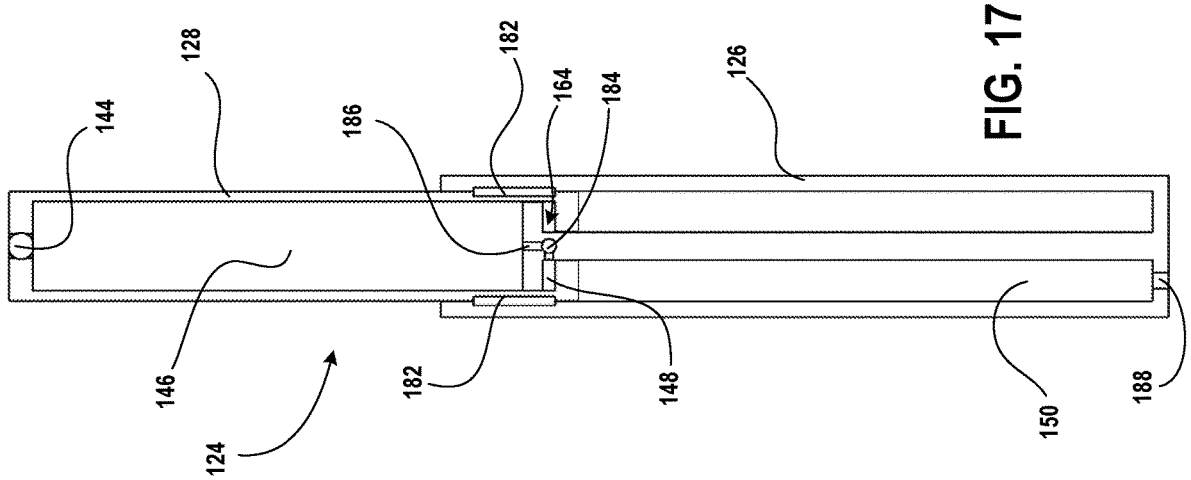
FIG. 19 is a simplified schematic diagram of the first seat post assembly of FIG. 17, in a fully retracted position.

FIGS. 17-19 illustrate translation of the upper tube 128 relative to the lower tube 126 without rotation of the upper tube 128 relative to the lower tube 126. As discussed above, the keys 182 remain in a same position relative to the upper tube 128 as the upper tube 128 translates from the fully extended position (see FIG. 17) to an intermediate position (see FIG. 18), and finally to the fully retracted position (see FIG. 19). The keys 182 translate with the upper tube 128 relative to the lower tube 126.

FIGS. 17-19 also schematically illustrate the first pneumatic chamber 146, the second pneumatic chamber 148, the third pneumatic chamber 150, the fill valve 144, an isolator 184 of the actuator valve 164, a fluid passage 186 via which the first pneumatic chamber 146 and the second pneumatic chamber 148 are coupleable, and a vent or check valve 188 (e.g., vent and fill valve 188). As discussed above, the first pneumatic chamber 146 and the second pneumatic chamber 148 may be disposed within the upper tube 128 of the seat post assembly 124, and the third pneumatic chamber 150 may be disposed within the lower tube 126. Part of the first pneumatic chamber 146 and all of the second pneumatic chamber 148 are also disposed within the upper tube 128.

The fill valve 144 used to fill the first pneumatic chamber 146 with, for example, air may be disposed within the upper tube 128, and the check valve 188, from which air may be removed from the system (e.g., the third pneumatic chamber 150) and/or added, may be disposed within the lower tube 126. The fluid passage 186 extends through the actuator valve 164 to fluidly couple the first pneumatic chamber 146 and the second pneumatic chamber 148. The isolator 184 of the actuator valve 164 may be activated externally to close the fluid passage 186 and prevent fluid from passing between the first pneumatic chamber 146 and the second pneumatic chamber 148. Other configurations may be provided.

For example, referring to FIGS. 20-22, the first pneumatic chamber 146 (e.g., the positive pressure chamber) may be disposed in the lower tube 126, and the second pneumatic chamber 148 (e.g., the negative pressure chamber) and the third pneumatic chamber 150 (e.g., the residual pressure chamber) may be disposed in the upper tube 128. In such a configuration, the fill valve 144 is disposed in the lower tube 126, and the check valve 188 is disposed in the upper tube 128. The isolator 184 of the actuator valve 164 is disposed within the piston shaft 155 within the lower tube 126. Like the example shown in FIGS. 17-19, the first pneumatic chamber 146 is configured to act as a spring configured to bias the upper tube 128 towards the fully extended position of the seat post assembly 124. The first pneumatic chamber 146 acts on an outer surface 190 of the upper tube 128 in the example shown in FIGS. 20-22 instead of the first side 166 of the piston head 154, as illustrated in the example of FIGS. 17-19.

As another example, referring to FIGS. 23-25, the seat post assembly 124 may include the third pneumatic chamber 150 (e.g., a first residual pressure chamber) and a fourth pneumatic chamber 192 (e.g., a second residual pressure chamber) disposed within the lower tube 126. An annular wall 194 (e.g., a capped annular wall) disposed within the lower tube 126 may separate the third pneumatic chamber 150 and the fourth pneumatic chamber 192. The upper tube 128 is open on a lower end, and a portion of the upper tube 128 (e.g., an annular wall of the upper tube 128) is disposed between the lower tube 126 (e.g., an inner annular surface of the lower tube 126) and the annular wall 194 (e.g., an outer annular surface of the annular wall 194) defining the fourth pneumatic chamber 192.

Unlike the examples shown in FIGS. 17-22, in which at least part of the piston 152 (e.g., the piston head 154 and the piston shaft 155) is positionally fixed relative to the lower tube 126, in the example shown in FIGS. 23-25, at least part of piston 152 (e.g., the piston head 154 and the piston shaft 155) is positionally fixed relative to the upper tube 128. In other words, the piston head 154 and the piston shaft 155, for example, move with the upper tube 128 relative to the lower tube 126. The seat post assembly 124 includes two vent or check valves (e.g., vent and fill valve 188 and vent and fill valve 196) corresponding to the first residual pressure chamber 150 and the second residual pressure chamber 192, respectively. The isolator 184 of the actuator valve 164 is disposed within the piston shaft 155 within the upper tube 128 (e.g., at or adjacent to the first distal end 132 of the upper tube 128). The fill valve 144 may also be disposed within the upper tube 128, at or adjacent to the first distal end 132 of the upper tube 128.

As yet another example, referring to FIGS. 26-28, the seat post assembly 124 again includes two residual pneumatic chambers (e.g., the third pneumatic chamber 150 and the fourth pneumatic chamber 192). The fourth pneumatic chamber 192, however, is disposed within the upper tube 128. The annular wall 194 disposed within the lower tube 126 may separate the third pneumatic chamber 150 and the first pneumatic chamber 146. The first pneumatic chamber 146 is disposed within the lower tube 126, and the second pneumatic chamber 148 is disposed within the upper tube 128 and the lower tube 126.

The seat post assembly 124 again includes two vent or check valves (e.g., vent and fill valve 188 and vent and fill valve 196) corresponding to the first residual pressure chamber 150 and the second residual pressure chamber 192, respectively. The vent and fill valve 196, however, is disposed in the upper tube 128, the fill valve 144 is disposed in the lower tube 126, and the isolator 184 of the actuator valve 164 is disposed within the piston shaft 155 within the upper tube 128 and the lower tube 126.

Figure 29:
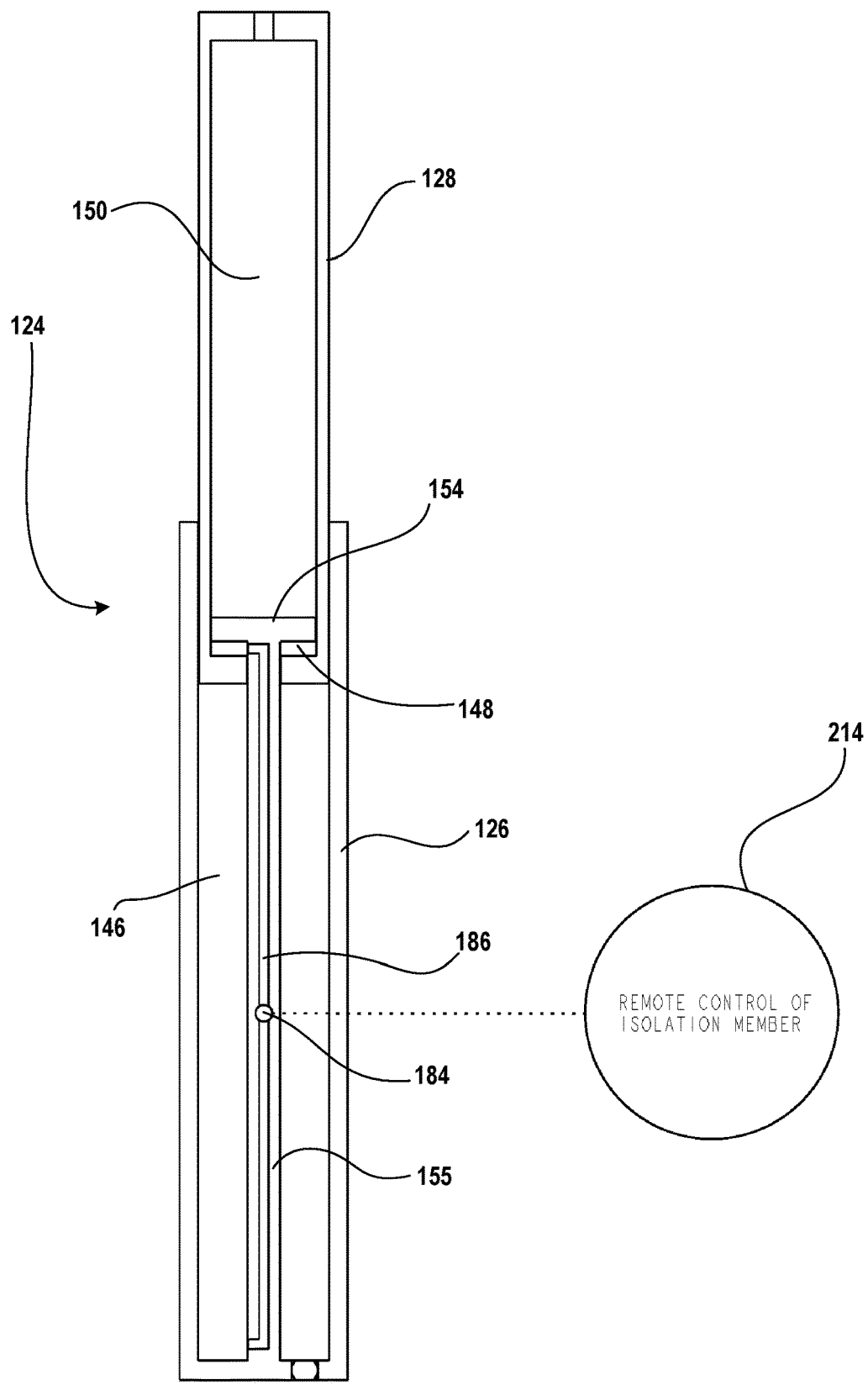
FIG. 29 is a simplified schematic diagram illustrating exemplary positioning of an isolator of an actuator valve.

Referring to FIG. 29, the isolator 184 may be located in any number of different positions along the fluid passage 186. As shown in FIG. 29, in which the first pneumatic chamber 146 is disposed within the lower tube 126, the fluid passage 186 may extend along the piston shaft 155, between the first pneumatic chamber 146 within the lower tube 126 and the second pneumatic chamber 148 within the upper tube 128. As shown in FIG. 29, the isolator 184 may, for example, be positioned within the fluid passage 186, approximately midway between the first pneumatic chamber 146 and the second pneumatic chamber 148. Other positioning may be provided. For example, the isolator may be closer or further away from the second pneumatic chamber 146 when the seat post assembly 124 is in the fully extended position.

The seat post assembly 124 or another part of the bicycle 100 includes an electronics module. The electronics module is incorporated as a part of, for example, the head 134 or the end cap 158 of the seat post assembly 124. The electronics module is configured to receive wireless signals from a wireless actuator 214 that is mounted to the handlebars 104 (see FIG. 1). The wireless actuator 214 is configured to operate the electronics module to open or close the isolator 184 of the actuator valve 164. To do so, a transmission signal is initiated by a rider by using an actuator of some type, such as a lever or a button, on the wireless actuator 214.

Figure 30:
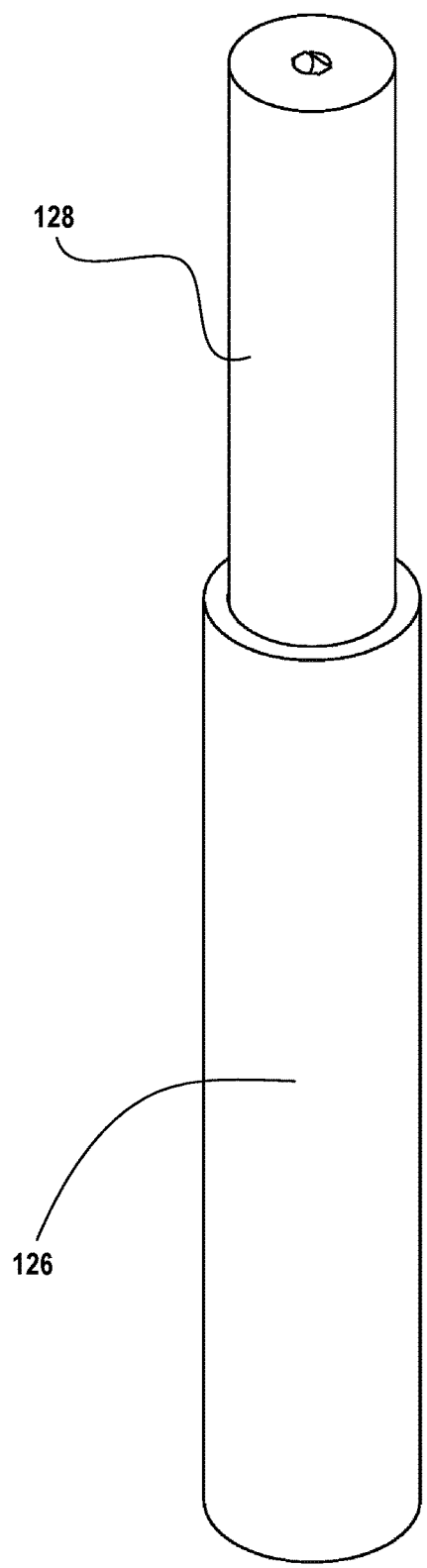
FIG. 30 is a perspective view of a seat post assembly constructed in accordance with the teachings of this disclosure, with a first telescoping configuration.
Figure 31:
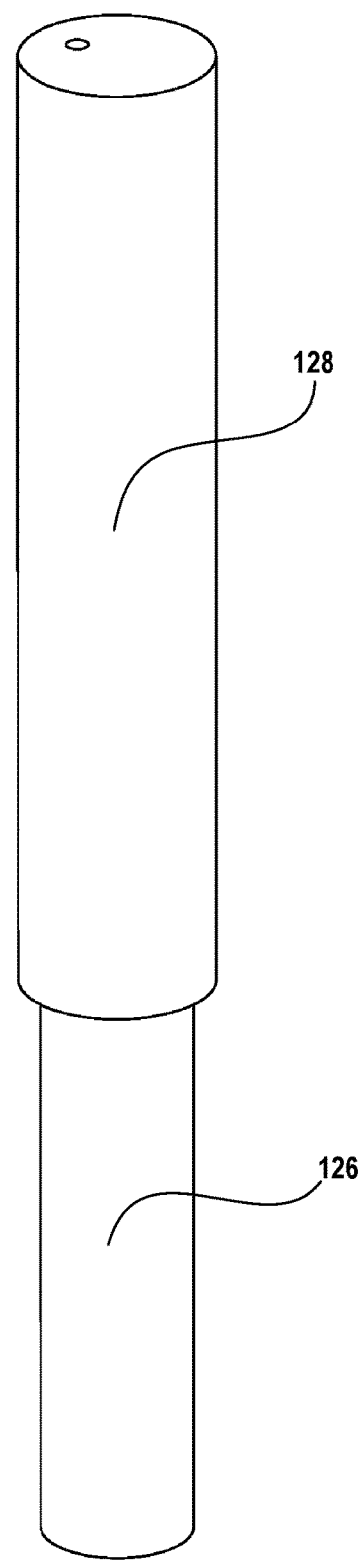
FIG. 31 is a perspective view of a seat post assembly constructed in accordance with the teachings of this disclosure, with a second telescoping configuration.

Referring to FIGS. 30 and 31, different telescoping configurations of the lower tube 126 and the upper tube 128 may be provided. For example, as shown in FIG. 30, the lower tube 126 may have an inner diameter that is equal to or approximately equal to (e.g., 5 mm or less greater than) an outer diameter of the upper tube 128, and the upper tube 128 may telescope into the lower tube 126. Alternatively, as shown in FIG. 31, the upper tube 128 may have an inner diameter that is equal to or approximately equal to (e.g., 5 mm or less greater than) an outer diameter of the lower tube 126, and the upper tube 128 may telescope on the lower tube 126.

Although certain seat post assemblies, bicycles, and methods have been described herein in accordance with the teachings of the present disclosure, the scope of coverage of this patent is not limited thereto. On the contrary, this patent covers all embodiments of the teachings of the disclosure that fairly fall within the scope of permissible equivalents.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations and/or acts are depicted in the drawings and described herein in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that any described program components and systems can generally be integrated together in a single software product or packaged into multiple software products.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, are apparent to those of skill in the art upon reviewing the description.

The Abstract of the Disclosure is provided to comply with 37 C.F.R. § 1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

It is intended that the foregoing detailed description be regarded as illustrative rather than limiting and that it is understood that the following claims including all equivalents are intended to define the scope of the invention. The claims should not be read as limited to the described order or elements unless stated to that effect. Therefore, all embodiments that come within the scope and spirit of the following claims and equivalents thereto are claimed as the invention.

What is claimed is:

1. A seat post assembly for a bicycle, the seat post assembly comprising:
   a first tube having a first distal end;
   a second tube having a second distal end, the first tube being movable relative to the second tube to establish a distance between the first distal end of the first tube and the second distal end of the second tube along a tube axis, the distance between the first distal end of the first tube and the second distal end of the second tube being at a maximum when the first tube is in a first position relative to the second tube, and the distance between the first distal end of the first tube and the second distal end of the second tube being at a minimum when the first tube is in a second position relative to the second tube;

a first chamber and a second chamber that are fluidly coupleable, the first chamber being a positive fluid chamber and the second chamber being a negative fluid chamber; and a fluid volume disposed in the first chamber and the second chamber, the fluid volume being entirely or greater than 80% a compressible fluid, wherein the first chamber is configured to act as a spring configured to bias the first tube towards the first position relative to the second tube.

2. The seat post assembly of claim 1, wherein the first chamber and the second chamber are within the first tube.

3. The seat post assembly of claim 2, further comprising a third chamber outside of a flow path connecting the first chamber and the second chamber, the third chamber being within the second tube.

4. The seat post assembly of claim 1, further comprising:
a piston separating the first chamber and the second chamber; and
a flow path connecting the first chamber and the second chamber through the piston.

5. The seat post assembly of claim 4, further comprising a valve including an isolator, the isolator being configured to move between a closed position closing the flow path and an open position opening the flow path between the first chamber and the second chamber, the relative movement between the first tube and the second tube being allowed when the isolator is in the open position.

6. The seat post assembly of claim 5, wherein the second chamber is configured to receive a portion of the compressible fluid when the isolator is in the open position and a force is applied to the first distal end of the first tube.

7. The seat post assembly of claim 4, wherein the piston has a first side and a second side opposite the first side, the first side of the piston partially defining the first chamber and the second side of the piston partially defining the second chamber, and
wherein a volume of the first chamber and a volume of the second chamber are based on a position of the piston relative to the first tube.

8. The seat post assembly of claim 7, wherein a total chamber volume, including the volume of the first chamber and the volume of the second chamber, is variable based on the position of the piston relative to the first tube, such that the total chamber volume when the first tube is in the first position relative to the second tube is greater than the total chamber volume when the first tube is in the second position relative to the second tube.

9. The seat post assembly of claim 7, wherein a surface area of the first side as viewed along the tube axis is greater than a surface area of the second side as viewed along the tube axis.

10. The seat post assembly of claim 1, wherein the compressible fluid is a gas.

11. The seat post assembly of claim 10, wherein the volume of the second chamber is no more than ten percent of the volume of the first chamber when the first tube is in the first position relative to the second tube.

12. The seat post assembly of claim 11, wherein the volume of the second chamber is no more than three percent of the volume of the first chamber when the first tube is in the first position relative to the second tube.

13. The seat post assembly of claim 1, wherein a volume of the first chamber is larger than a volume of the second chamber when the first tube is in the first position relative to the second tube.

14. The seat post assembly of claim 1, wherein when the first tube is in the first position relative to the second tube, a majority of the fluid volume disposed in the first chamber is the compressible fluid.

15. The seat post assembly of claim 1, further comprising a fill valve,
wherein the fill valve is disposed within the first chamber.

16. The seat post assembly of claim 1, wherein the first tube is keyed to the second tube, such that the first tube is translatable relative to the second tube but is not rotatable relative to the second tube.

17. The seat post assembly of claim 1, wherein the first chamber and the second chamber are disposed within the second tube.

18. A seat post assembly for a bicycle, the seat post assembly comprising:
a telescoping tube structure including a first tube and a second tube, the first tube and the second tube being movable relative to each other, wherein the telescoping tube structure has a maximum length when the first tube is in a first position relative to the second tube;
a first chamber and a second chamber that are fluidly coupleable, wherein the first chamber is disposed within the first tube or the second tube, and the second chamber is disposed within the first tube or the second tube; and
a fluid disposed in the first chamber and the second chamber, a portion of the fluid in the first chamber being configured to act as a spring configured to bias the first tube towards the first position relative to the second tube,
wherein the first chamber and the second chamber are fluidly coupleable, such that the second chamber is configured to receive part of the fluid when the telescoping tube structure is compressed, and
wherein a volume of the first chamber is larger than a volume of the second chamber when the first tube is in the first position relative to the second tube.

19. The seat post assembly of claim 18, wherein the first chamber is a positive fluid chamber, and the second chamber is a negative fluid chamber.

20. The seat post assembly of claim 18, wherein the volume of the second chamber is no more than ten percent of the volume of the first chamber when the first tube is in the first position relative to the second tube.

21. The seat post assembly of claim 20, wherein the volume of the second chamber is no more than three percent of the volume of the first chamber when the first tube is in the first position relative to the second tube.

22. The seat post assembly of claim 18, wherein the fluid includes a compressible fluid.

23. The seat post assembly of claim 22, wherein the second chamber includes less than three percent of the fluid by volume when the first tube is in the first position relative to the second tube.

24. A seat post assembly for a bicycle, the seat post assembly comprising:
a telescoping tube structure including a first tube and a second tube, the first tube having a first distal end and the second tube having a second distal end, the first tube being movable relative to the second tube, such that a distance between the first distal end of the first tube and the second distal end of the second tube is at a maximum when the first tube is in a first position relative to the second tube, and the distance between the first distal end of the first tube and the second distal end of the second tube being at a minimum when the first tube is in a second position relative to the second tube;

a first chamber and a second chamber disposed within the telescoping tube structure, wherein the first chamber and the second chamber include a fluid, the fluid in the first chamber forming a pneumatic spring configured to bias the first tube in a direction away from the second tube;

a piston separating the first chamber and the second chamber; and a flow path connecting the first chamber and the second chamber;

wherein the piston has a first side and a second side opposite the first side, the first side of the piston partially defining the first chamber and the second side of the piston partially defining the second chamber, and wherein a volume of the first chamber is larger than a volume of the second chamber when the distance between the first distal end of the first tube and the second distal end of the second tube is at the maximum, the volume of the first chamber is smaller than the volume of the second chamber when the distance between the first distal end of the first tube and the second distal end of the second tube is at the minimum.

* * * * *